United States Patent
Sievers et al.

(10) Patent No.: US 11,117,219 B2
(45) Date of Patent: Sep. 14, 2021

(54) ADDITIVE MANUFACTURING APPARATUS AND SYSTEM WITH VACUUM ASSEMBLY, AND METHOD OF USING THE SAME

(71) Applicant: The Boeing Company, Chicago, IL (US)

(72) Inventors: Daniel E. Sievers, Owens Cross Roads, AL (US); Peter J. Bocchini, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 402 days.

(21) Appl. No.: 16/200,510

(22) Filed: Nov. 26, 2018

(65) Prior Publication Data

US 2020/0164466 A1    May 28, 2020

(51) Int. Cl.
| | |
|---|---|
| *B23K 26/34* | (2014.01) |
| *B23K 26/342* | (2014.01) |
| *B33Y 10/00* | (2015.01) |
| *B33Y 30/00* | (2015.01) |
| *B33Y 40/00* | (2020.01) |

(Continued)

(52) U.S. Cl.
CPC .......... *B23K 26/342* (2015.10); *B23K 26/083* (2013.01); *B23K 26/128* (2013.01); *B23K 26/1464* (2013.01); *B23K 26/16* (2013.01); *B23K 26/703* (2015.10); *B33Y 10/00* (2014.12);

(Continued)

(58) Field of Classification Search
CPC .. B23K 26/703; B23K 26/083; B23K 26/128; B23K 26/16; B23K 26/1464; B23K 15/0086; B33Y 10/00; B33Y 33/00; B33Y 40/00; B33Y 50/02; B29C 67/00;

(Continued)

(56) References Cited

U.S. PATENT DOCUMENTS

| | | | |
|---|---|---|---|
| 10,011,089 B2 | 7/2018 | Lyons et al. | |
| 2002/0090410 A1* | 7/2002 | Tochimoto | B29C 64/321 |
| | | | 425/215 |

(Continued)

FOREIGN PATENT DOCUMENTS

EP         3103569 A1    12/2016

OTHER PUBLICATIONS

Extended European Search Report (EESR), European Patent Office, dated Mar. 3, 2020, for Application No. EP19194890.0, Applicant The Boeing Company, 9 pages.

*Primary Examiner* — Brian W Jennison

(57) ABSTRACT

There is provided an AM apparatus for an AM process. The AM apparatus has an AM assembly with a build chamber to support part(s) built with a powder, in a build operation. Unused powder accumulates in the build chamber during the build operation. The AM apparatus has a vacuum assembly with duct line(s) in flow communication with the build chamber, and a powder receptacle in flow communication with the duct line(s). The powder receptacle has coupling member(s) allowing the powder receptacle to be reversibly attached to the duct line(s). The vacuum assembly includes a vacuum apparatus coupled to, and in flow communication with, the powder receptacle, via vacuum duct line(s). The vacuum assembly pulls the unused powder from the build chamber to the powder receptacle, and provides an automated removal of the unused powder from the build chamber into the powder receptacle, to avoid manual removal of the unused powder.

20 Claims, 10 Drawing Sheets

(51) Int. Cl.
  *B33Y 50/02*   (2015.01)
  *B23K 26/70*   (2014.01)
  *B23K 26/08*   (2014.01)
  *B23K 26/12*   (2014.01)
  *B23K 26/14*   (2014.01)
  *B23K 26/16*   (2006.01)

(52) U.S. Cl.
  CPC ............... *B33Y 30/00* (2014.12); *B33Y 40/00* (2014.12); *B33Y 50/02* (2014.12)

(58) Field of Classification Search
  CPC ................. B29C 64/153; B22F 3/1055; B22F 2003/1056; B22F 2003/1059
  See application file for complete search history.

(56) References Cited

U.S. PATENT DOCUMENTS

| | | | |
|---|---|---|---|
| 2004/0084814 A1* | 5/2004 | Boyd | B33Y 40/00 264/497 |
| 2007/0023977 A1 | 2/2007 | Braun et al. | |
| 2017/0341299 A1 | 11/2017 | Kniola et al. | |
| 2019/0054697 A1* | 2/2019 | Alonso | B29C 64/379 |
| 2019/0151954 A1* | 5/2019 | Xiao | B22F 8/00 |

* cited by examiner

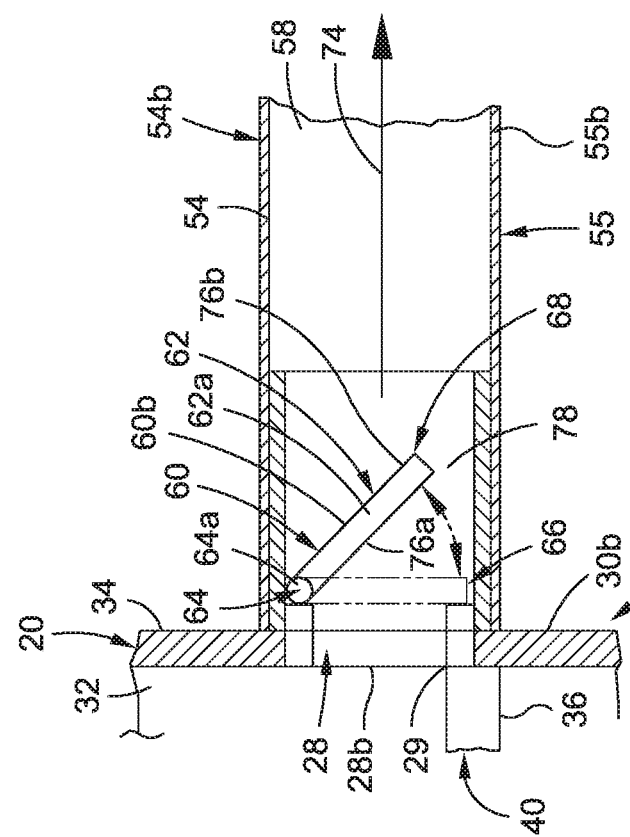
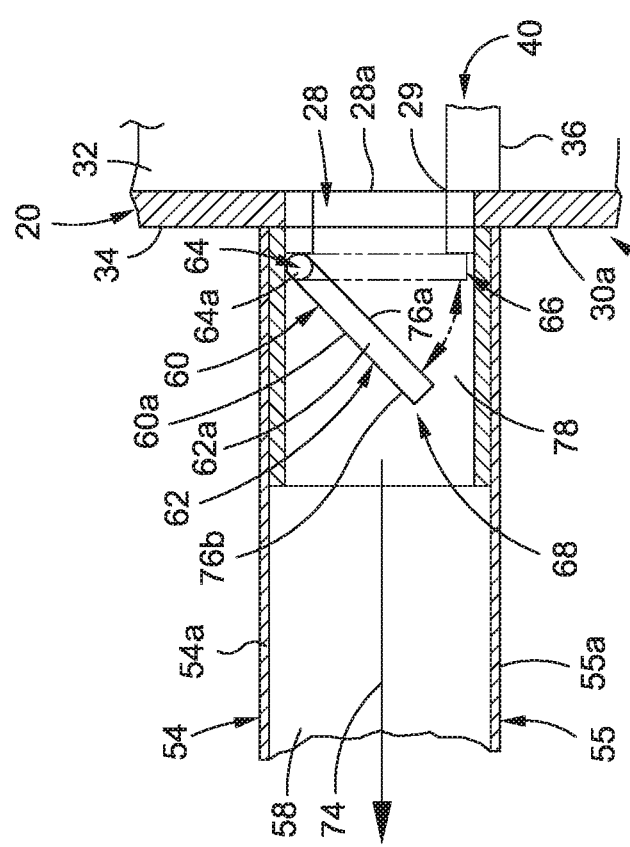

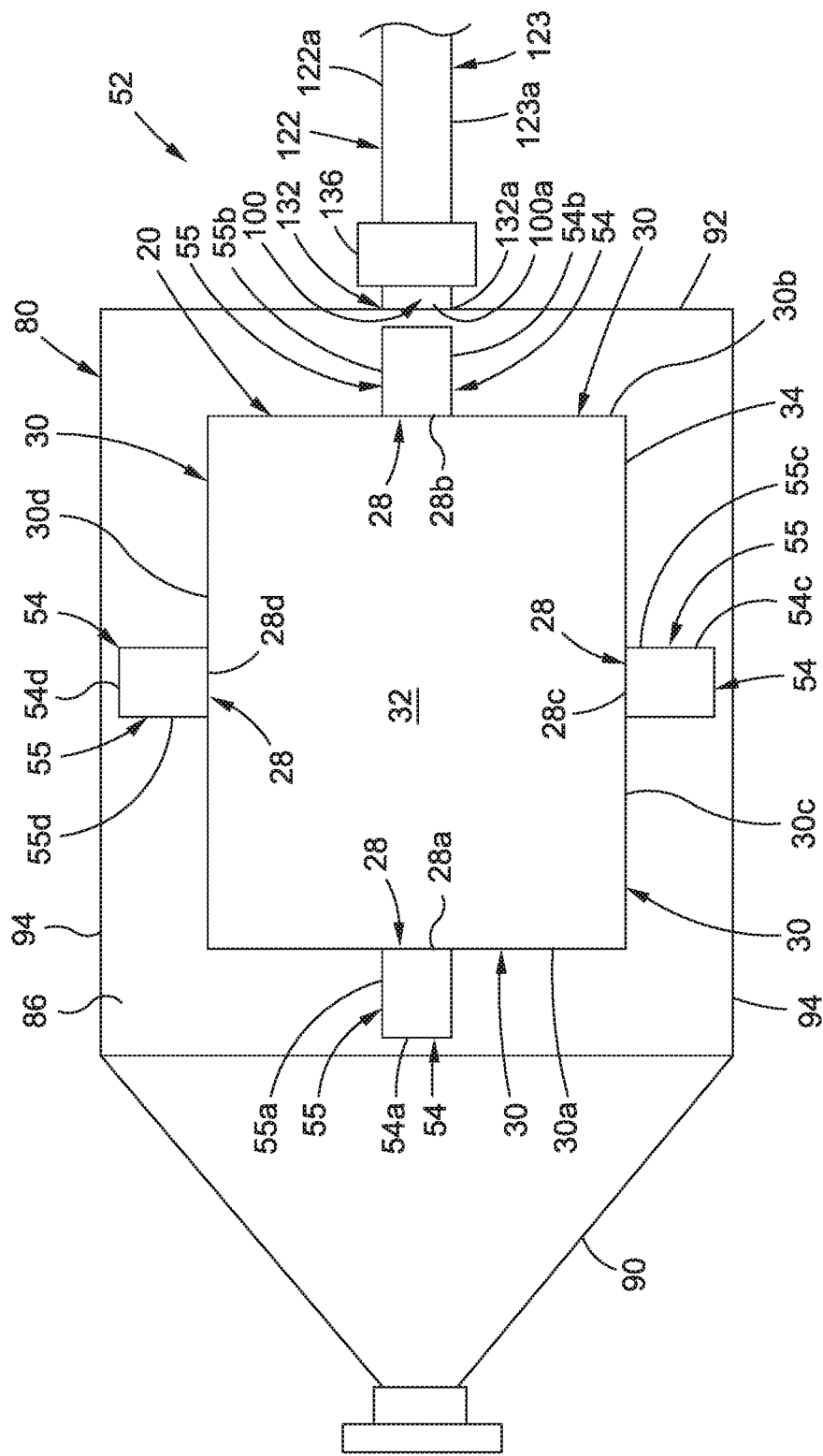

ADDITIVE MANUFACTURING APPARATUS AND SYSTEM WITH VACUUM ASSEMBLY, AND METHOD OF USING THE SAME

BACKGROUND

1) Field of the Disclosure

The disclosure relates generally to apparatuses, systems, and methods for manufacturing parts, and more particularly, to apparatuses, systems, and methods for additive manufacturing of parts, such as aircraft parts.

2) Description of Related Art

Various aircraft parts may be manufactured using additive manufacturing processes. Additive manufacturing processes are used to fabricate or manufacture three-dimensional parts or objects by adding layer-upon-layer of a build material, such as a powder, using computer controlled additive manufacturing machines or apparatuses, and computer software, such as computer-aided design (CAD) software.

In particular, metal aircraft parts may be manufactured using an additive manufacturing process that uses a high-power laser or electron beam to melt and fuse powder, such as metal powder, and additively build one or more parts layer by layer in a build chamber with a build operation. However, with such additive manufacturing process, unused powder accumulates in the build chamber on and around the part or parts being built, and such unused powder must be removed before the build chamber can be used to build another part or parts.

A known method and apparatus for removing the unused powder from the build chamber include manually using an industrial hand-held vacuum in the build chamber after every build operation, to vacuum up the unused powder accumulated in the build chamber and on the part or parts. Such manual vacuuming to remove the unused powder may be time consuming and labor intensive, and may result in increased manufacturing costs.

Therefore, it would be advantageous to have an additive manufacturing apparatus, system, and method that take into account one or more of the issues discussed above, that avoid manual removal and collection of unused powder, and that provide advantages over known apparatuses, systems, and methods.

SUMMARY

Example implementations of the present disclosure provide for an additive manufacturing apparatus, system, and method that provide significant advantages over existing apparatuses, systems, and methods.

In one version there is provided an additive manufacturing (AM) apparatus for an additive manufacturing (AM) process. The additive manufacturing apparatus comprises an additive manufacturing (AM) assembly. The additive manufacturing assembly comprises a build assembly having a build chamber to support one or more parts built with a powder, in a build operation of the additive manufacturing process. Unused powder accumulates in the build chamber during the build operation.

The additive manufacturing apparatus further comprises a vacuum assembly coupled to the build chamber of the additive manufacturing assembly. The vacuum assembly comprises one or more duct lines in flow communication with the build chamber. Each of the one or more duct lines has a check valve assembly. The check valve assembly comprises a check valve and an actuator to control a flow of the unused powder from the build chamber. The vacuum assembly further comprises a powder receptacle in flow communication with the one or more duct lines. The powder receptacle comprises one or more coupling members allowing the powder receptacle to be reversibly attached to the one or more duct lines, and to be reversibly attached to one or more vacuum duct lines. The vacuum assembly further comprises a vacuum apparatus coupled to, and in flow communication with, the powder receptacle, via the one or more vacuum duct lines.

The vacuum assembly pulls the unused powder from the build chamber to the powder receptacle, via the one or more duct lines. The vacuum assembly operates to provide an automated removal of the unused powder from the build chamber into the powder receptacle. This avoids a manual removal of the unused powder from the build chamber.

In another version there is provided an additive manufacturing system for an additive manufacturing process. The additive manufacturing system comprises an additive manufacturing apparatus. The additive manufacturing apparatus comprises an additive manufacturing assembly and a vacuum assembly.

The additive manufacturing assembly comprises a build assembly having a build chamber to support one or more parts built with a powder, in a build operation of the additive manufacturing process. Unused powder accumulates in the build chamber during the build operation. The additive manufacturing assembly further comprises a powder delivery assembly to supply the powder to the build assembly, and an energy delivery assembly to melt the powder in the build chamber used to build the one or more parts, during the build operation. The additive manufacturing assembly further comprises a powder overflow chamber, and a housing structure that houses the build assembly, the powder delivery assembly, the energy delivery assembly, and the powder overflow chamber.

The vacuum assembly is coupled to the build chamber of the additive manufacturing apparatus, via one or more housing openings. The vacuum assembly comprises one or more duct lines in flow communication with the build chamber. Each of the one or more duct lines has a check valve assembly. The check valve assembly comprises comprising a check valve and an actuator, to control a flow of the unused powder from the build chamber. The vacuum assembly further comprises a powder receptacle located outside of the housing structure. The powder receptacle is in flow communication with the one or more duct lines. The powder receptacle comprises one or more coupling members allowing the powder receptacle to be reversibly attached to the one or more duct lines, and to be reversibly attached to one or more vacuum duct lines.

The vacuum assembly further comprises a vacuum apparatus coupled to, and in flow communication with, the powder receptacle, via the one or more vacuum duct lines. Each of the one or more vacuum duct lines is coupled to a filter element.

The additive manufacturing apparatus further comprises a power source coupled to the additive manufacturing assembly and coupled to the vacuum assembly, to power the additive manufacturing assembly and to power the vacuum assembly. The additive manufacturing apparatus further comprises a control system coupled to the additive manufacturing assembly and coupled to the vacuum assembly, to control the additive manufacturing assembly and to control the vacuum assembly.

The vacuum assembly pulls the unused powder from the build chamber to the powder receptacle, via the one or more duct lines. The vacuum assembly operates to provide an automated removal of the unused powder from the build chamber into the powder receptacle. This avoids a manual removal of the unused powder from the build chamber.

In another version there is provided a method of using an additive manufacturing apparatus with a vacuum assembly, to automatically remove unused powder accumulated during an additive manufacturing process. The method comprises the step of building in a build chamber of the additive manufacturing apparatus, one or more parts with a powder, using a build operation of the additive manufacturing process, wherein unused powder accumulates in the build chamber during the build operation.

The method further comprises the step of automatically removing the unused powder from the build chamber, using the vacuum assembly of the additive manufacturing apparatus. The vacuum assembly is coupled to the build chamber. The vacuum assembly comprises one or more duct lines in flow communication with the build chamber, via one or more build chamber openings. Each of the one or more duct lines has a check valve assembly comprising a check valve and an actuator, to control a flow of the unused powder from the build chamber.

The vacuum assembly further comprises a powder receptacle in flow communication with the one or more duct lines. The powder receptacle comprises one or more coupling members allowing the powder receptacle to be reversibly attached to the one or more duct lines and to be reversibly attached to one or more vacuum duct lines. The vacuum assembly further comprises a vacuum apparatus coupled to, and in flow communication with, the powder receptacle, via the one or more vacuum duct lines.

The vacuum assembly pulls and transfers the unused powder from the build chamber to the powder receptacle, via the one or more duct lines. This avoids a manual removal of the unused powder from the build chamber.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary version, but which are not necessarily drawn to scale, wherein:

FIG. 2B is an illustration of an enlarged view of circle 2B of FIG. 2A, showing an exemplary version of a first check valve assembly of the additive manufacturing apparatus of the disclosure;

FIG. 2C is an illustration of an enlarged view of circle 2C of FIG. 2A, showing an exemplary version of a second check valve assembly of the additive manufacturing apparatus of the disclosure;

FIG. 2F is an illustration of an enlarged top sectional view of an exemplary version of a vacuum assembly of the disclosure with four duct lines coupled between a build chamber and a powder receptacle;

The figures shown in this disclosure represent various aspects of the embodiments presented, and only differences will be discussed in detail.

DETAILED DESCRIPTION

Disclosed versions or embodiments will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

Figure 1A:
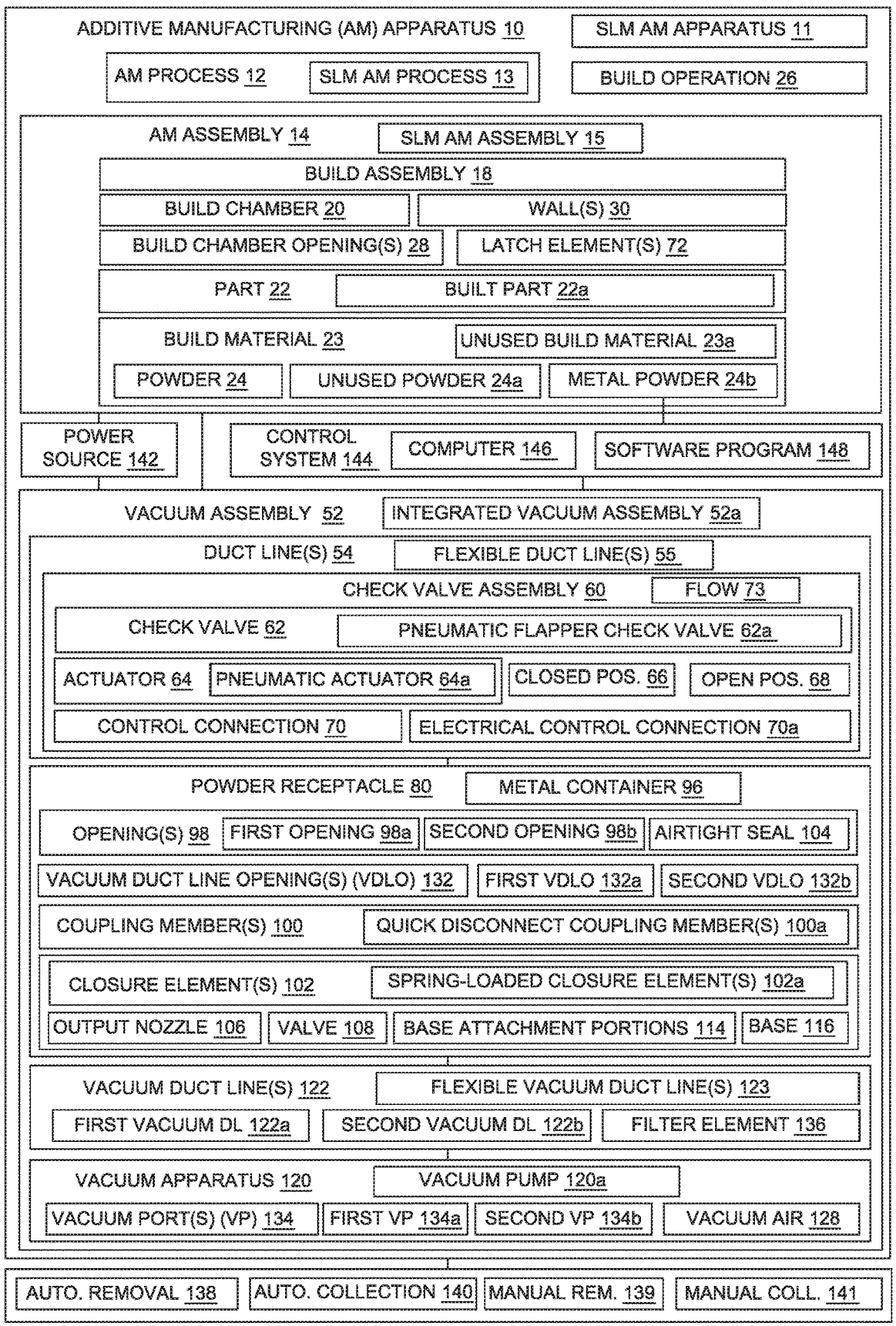
FIG. 1A is an illustration of a functional block diagram showing an exemplary version of an additive manufacturing apparatus of the disclosure.
Figure 1B:
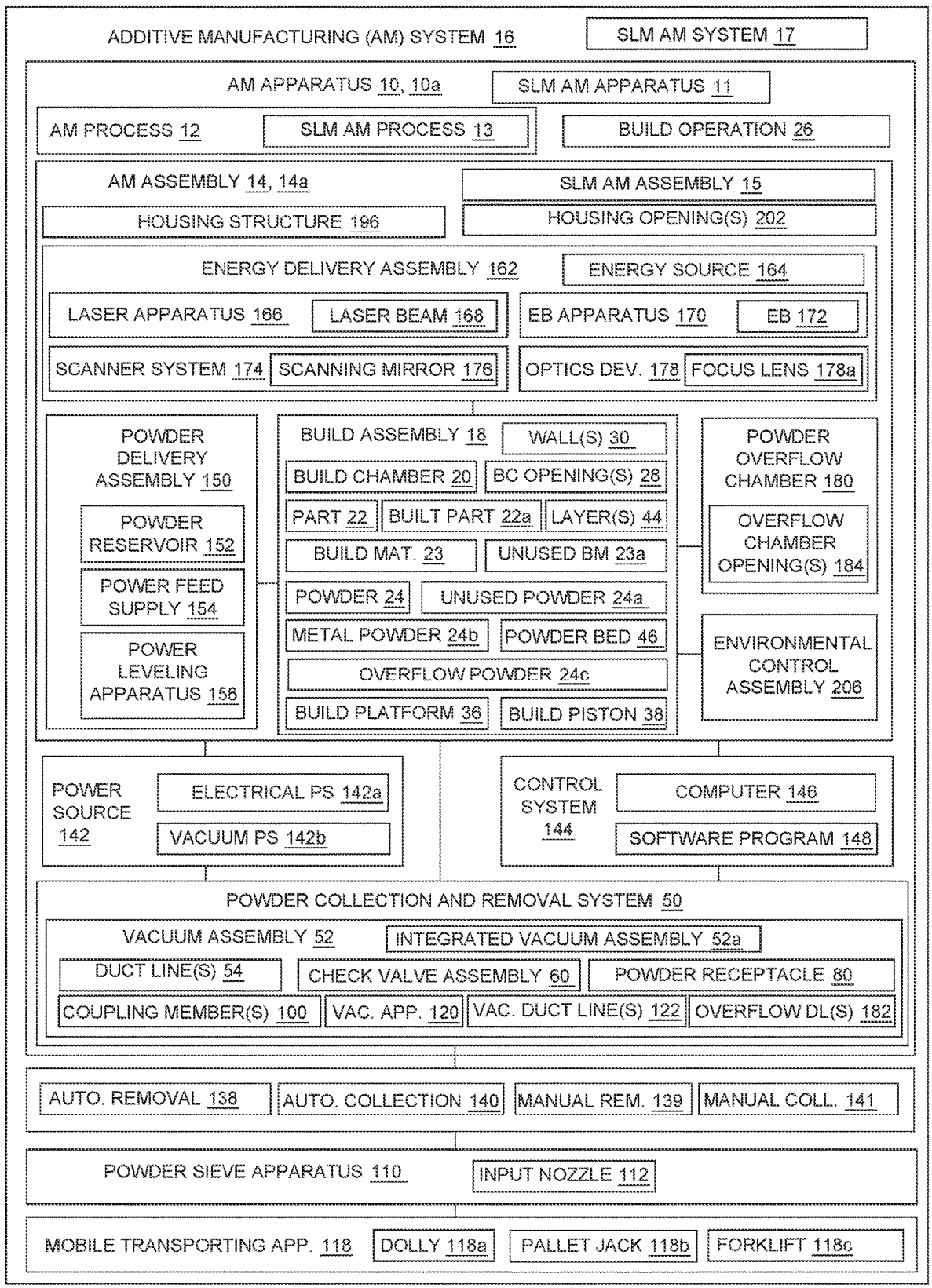
FIG. 1B is an illustration of a functional block diagram showing an exemplary version of an additive manufacturing system of the disclosure.
Figure 2A:
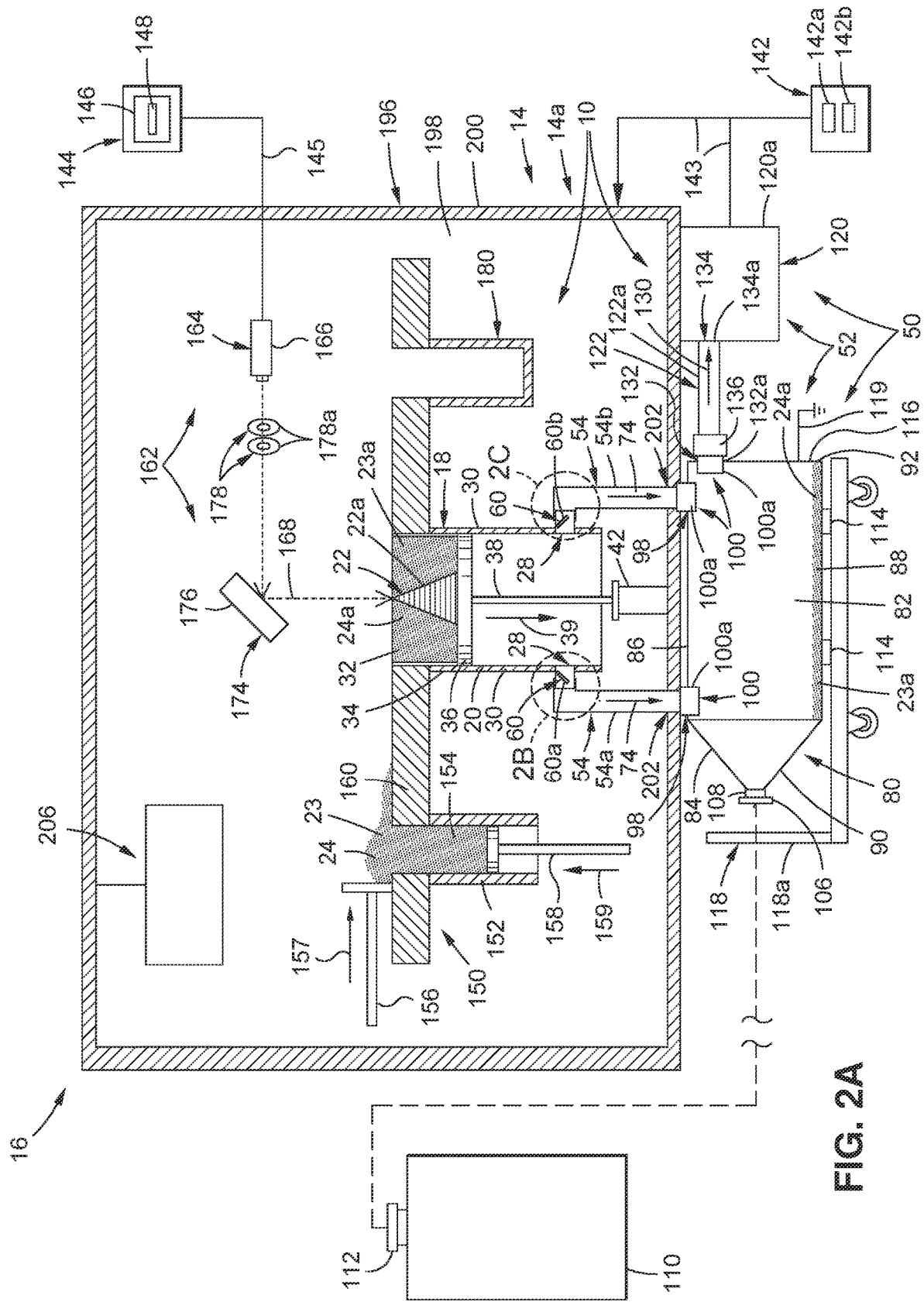
FIG. 2A is an illustration of a schematic diagram showing a front sectional view of an exemplary version of an additive manufacturing system with an exemplary version of an additive manufacturing apparatus of the disclosure.

Now referring to the Figures, FIG. 1A is an illustration of a functional block diagram showing an exemplary version of an additive manufacturing (AM) apparatus 10 of the disclosure. FIG. 1B is an illustration of a functional block diagram showing an exemplary version of an additive manufacturing (AM) system 16 of the disclosure. FIG. 2A is an illustration of a schematic diagram showing a front sectional view of an exemplary version of the additive manufacturing system 16 with an exemplary version of the additive manufacturing apparatus 10 of the disclosure.

In one version of the disclosure, there is provided the additive manufacturing (AM) apparatus 10 (see FIGS. 1A-1B, 2A) for an additive manufacturing (AM) process 12 (see FIGS. 1A-1B). The AM apparatus 10 preferably comprises a selective laser melting (SLM) AM apparatus 11 (see FIGS. 1A-1B), and the AM process 12 preferably comprises a selective laser melting (SLM) AM process 13 (see FIGS. 1A-1B). However, the AM apparatus 10 and the AM process 12 are not limited to the SLM AM apparatus 11 and the SLM AM process 13, and other AM apparatuses 10 and other AM processes 12 may be used, for example, laser sintering such as direct metal laser sintering or selective laser sintering (SLS) apparatuses and processes, laser metal deposition such as direct metal deposition apparatus and process, directed light fabrication apparatus and process, laser engineered net shaping (LENS) apparatus and process, fused deposition modeling (FDM) apparatus and process, 3D printing apparatus and process, or another suitable additive manufacturing apparatus and process.

As used herein, "additive manufacturing process" means any process for manufacturing three-dimensional objects in which successive layers of material, for example, metal material, are laid down, for example, under computer control, and in which the design of the object is digitally defined by computer software, for example, computer-aided-design (CAD) software.

As shown in FIG. 1A, the AM apparatus 10 comprises an additive manufacturing (AM) assembly 14, such as a selective laser melting (SLM) AM assembly 15. In one version, the AM apparatus 10 (see FIGS. 1B, 2A) comprises an AM apparatus 10a (see FIG. 1B), having the AM assembly 14 (see FIGS. 1B, 2A) comprising an AM assembly 14a (see FIGS. 1B, 2A). As shown in FIG. 1B, the AM assembly 14 preferably comprises a SLM AM assembly 15.

In another version of the disclosure, there is provided an additive manufacturing (AM) system 16 (see FIGS. 1B, 2A), such as a selective laser melting (SLM) AM system 17 (see FIG. 1B), that includes the AM apparatus 10a, the AM assembly 14a, a powder collection and removal system 50, a powder sieve apparatus 110, and a mobile transporting apparatus 118, discussed in further detail below.

As shown in FIGS. 1A-1B, and 2A, the AM assembly 14 comprises a build assembly 18 with a build chamber 20, to support one or more parts 22, or objects, built with layers 44 (see FIG. 1B) into one or more built parts 22a, or built objects, with a build material 23, such as a powder 24, in a build operation 26 of the AM process 12. Unused build material 23a (see FIGS. 1A-1B, 2A), such as unused powder 24a (see FIGS. 1A-1B, 2A), accumulates in the build chamber 20 during the build operation 26, and needs to be removed from the build chamber 20 before additional parts 22 may be built.

Preferably, the build material 23, such as powder 24, used to build the one or more parts 22 is metal powder 24b (see FIGS. 1A-1B). The metal powder 24b may include any metal or metal alloy in powder form. As one example, metal powder 24b includes the same material as part 22. For example, the metal powder 24b may be pure material having no additional filler materials. Alternatively, the metal powder 24b may include additional filler materials. However, another suitable type of build material 23, or powder 24, may also be used.

The built parts 22a manufactured by the AM process 12 may significantly reduce the number of steps required in an assembly operation. Further, the AM process 12 may produce built parts 22a having a complex geometric structure and shape. As one example, the AM process 12 utilizing the AM apparatus 10 may produce built parts 22a having part specific features, such as, openings, fastener holes, internal lattice structures, and the like, which may substantially reduce or even eliminate the assembly steps of machining and/or installing such features in built parts 22a.

As shown in FIGS. 1A-1B and 2A, the AM assembly 14 of the AM apparatus 10 comprises one or more build chamber openings 28, or doors, which may be formed, such as by cutting, drilling, or another suitable forming process, through one or more walls 30 of the build chamber 20. Preferably, the build chamber 20 has four (4) walls 30 (see FIGS. 1A-2B, 2F), including a first wall 30a (see FIG. 2F), a second wall 30b (see FIG. 2F), a third wall 30c (see FIG. 2F), and a fourth wall 30d (see FIG. 2F), where each wall 30 has the build chamber opening 28 formed through the wall 30 in the same, or substantially the same location, on each wall 30, so that the build chamber openings 28 may be aligned, or substantially aligned, with each other. Unless otherwise indicated, the terms "first," "second," "third", and "fourth", are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item. As shown in FIG. 2A, the build chamber 20 has an interior portion 32 and an exterior portion 34.

As shown in FIGS. 1B and 2A, the build assembly 18 of the AM assembly 14a, preferably further comprises a build platform 36, and a build piston 38 that raises and lowers, or is configured to raise and lower, the build platform 36. The build piston 38 is preferably coupled to a build piston actuator 42 (see FIG. 2A) that moves or actuates, or is configured to move, or actuate, the build piston 38 downwardly, such as in downward direction 39 (see FIG. 2A), as the one or more parts 22 are built with the build material 23, such as powder 24, and upwardly after the one or more parts 22 are built, and the unused build material 23a, such as unused powder 24a, is removed. The build platform 36 and the build piston 38 function like an elevator, and move downwardly after each layer 44 of powder 24 is added, to build the one or more parts 22 layer 44 by layer 44. The one or more parts 22 are built with the build material 23, such as powder 24, and the one or more built parts 22a are within a powder bed 46 (see FIGS. 1B, 2D) that forms a build volume 48 (see FIG. 2D) as the one or more parts 22 are built into the built parts 22a.

As shown in FIGS. 1A-1B and 2A, the AM apparatus 10 comprises a vacuum assembly 52. The vacuum assembly 52 may comprise an integrated vacuum assembly 52a (see FIGS. 1A-1B) with one or more components integrated with the AM assembly 14 of the AM apparatus 10. The vacuum assembly 52 is preferably part of a powder collection and removal system 50 (see FIGS. 1B, 2A) that is part of the AM system 16 (see FIGS. 1B, 2A). The vacuum assembly 52 may also be referred to as an in situ, as the vacuum assembly 52 is positioned at the site of the AM apparatus 10 and at the site where the AM process 12 takes place.

As shown in FIG. 2A, the vacuum assembly 52 is coupled to the build chamber 20 of the build assembly 18. As used herein, "coupled" means associated directly as well as indirectly. The vacuum assembly 52 comprises one or more duct lines 54 (see FIGS. 1A-1B, 2A), such as vacuum lines or vacuum tubes, in flow communication with, and coupled to, the build chamber 20. Preferably, each duct line 54 is a flexible duct line 55 (see FIG. 1A). The vacuum assembly 52 may have one duct line 54, two duct lines 54, three duct lines 54, four duct lines 54, or more than four duct lines 54. FIG. 2A shows a first duct line 54a positioned opposite a second duct line 54b. Preferably, the vacuum assembly 52 has four duct lines 54, such as four flexible duct lines 55, including the first duct line 54a (see FIG. 2F), such as a first flexible duct line 55a (see FIG. 2F), coupled to a first wall 30a (see FIG. 2F) of the build chamber 20; the second duct line 54b (see FIG. 2F), such as a second flexible duct line 55b (see FIG. 2F), coupled to a second wall 30b (see FIG. 2F) of the build chamber 20; a third duct line 54c (see FIG. 2F), such as a third flexible duct line 55c (see FIG. 2F), coupled to a third wall 30c (see FIG. 2F) of the build chamber 20; and a fourth duct line 54d (see FIG. 2F), such as a fourth flexible duct line 55d (see FIG. 2F), coupled to a fourth wall 30d (see FIG. 2F) of the build chamber 20.

Each of the one or more duct lines 54, such as the one or more flexible duct lines 55, has a first end 56a (see FIG. 2D), a second end 56b (see FIG. 2D), and an elongated body 58 (see FIG. 2D) formed between the first end 56a and the second end 56b. Each of the one or more duct lines 54, such as the one or more flexible duct lines 55, is preferably hollow or non-solid, so that unused build material 23a, such as unused powder 24a, can flow through the interior of the one or more duct lines 54 in a flow path direction 74 (see FIG. 2A). The first end 56a (see FIG. 2D) of each of the one or more duct lines 54, such as the one or more flexible duct lines 55, is coupled to a respective build chamber opening 28 formed in the wall 30 of the build chamber 20. Preferably, the first end 56a of each of the one or more duct lines 54, such as the one or more flexible duct lines 55, is welded, or fastened with a silicone o-ring, to the build chamber opening 28 formed in the wall 30 of the build chamber 20, to ensure a sealed interface between the first end 56a and the wall 30 of the build chamber 20. The first end 56a (see FIG. 2D) of each of the one or more duct lines 54, such as the one or more flexible duct lines 55, is preferably located adjacent to or below the build platform 36 (see FIG. 2D), so that when the build platform 36 with the one or more parts 22 is lowered as far as allowed, the one or more duct lines 54, such as the one or more flexible duct lines 55, have free access to remove unused build material 23a, such as unused powder 24a, from the build chamber 20, as well as unused build material 23a, such as unused powder 24a, from the built part 22a itself.

As shown in FIGS. 1A-1B and 2A, each of the one or more duct lines 54, such as the one or more flexible duct lines 55, preferably has a check valve assembly 60. FIG. 2A shows a first check valve assembly 60a and a second check valve assembly 60b. As shown in FIG. 1A, the check valve assembly 60 preferably comprises a check valve 62, such as a pneumatic flapper check valve 62a, or another suitable check valve 62. The check valve assembly 60 further preferably comprises an actuator 64 (see FIG. 1A), such as a pneumatic actuator 64a (see FIG. 1A), for actuating the check valve 62, such as the pneumatic flapper check valve 62a, from a closed position 66 (see FIG. 1A) to an open position 68 (see FIG. 1A). A control connection 70 (see FIG. 1A), such as an electrical control connection 70a (see FIG. 1A), or another suitable control connection 70, may be coupled to the check valve assembly 60, to control the actuator 64, and in turn, to control the movement of the check valve 62. The check valve assembly 60 may further comprise other suitable components or parts, depending on the type of check valve assembly 60 used.

As shown in FIGS. 1A-1B and 2A, the vacuum assembly 52 further comprises a powder receptacle 80. As shown in FIG. 2A, the powder receptacle 80 is in flow communication with the one or more duct lines 54, such as the one or more flexible duct lines 55. The vacuum assembly 52 pulls any unused build material 23a (see FIGS. 1A, 2A), such as unused powder 24a (see FIGS. 1A, 2A), from the build chamber 20 to the powder receptacle 80, via the one or more duct lines 54, such as the one or more flexible duct lines 55.

The powder receptacle 80 may be in the form of a metal container 96 (see FIG. 1A), such as made of stainless steel, or another suitably strong and durable metal material. In one version, as shown in FIG. 2A, the powder receptacle 80 has an interior 82, an exterior 84, a top end 86, a bottom end 88, a front end 90, a back end 92, and sides 94 (see FIG. 2F). The interior 82 of the powder receptacle 80 is preferably hollow or non-solid, and may be sized to receive a predetermined amount of unused build material 23a, such as unused powder 24a. For example, the interior 82 of the powder receptacle 80 may be of a size to hold twenty-four liters (24L) of unused build material 23a, such as unused powder 24a, or may be of another suitable size to hold another suitable amount.

The top end 86 (see FIG. 2A) of the powder receptacle 80 (see FIGS. 1A, 2A) may have one or more openings 98 (see FIGS. 1A, 2A) formed through the exterior 84 (see FIG. 2D) of the powder receptacle 80, to receive, or configured to receive, one or more coupling members 100 (see FIGS. 1A-1B, 2A) attached to, or configured to be attached to, the one or more duct lines 54 (see FIGS. 1A-1B, 2A). The one or more openings 98 (see FIGS. 1A, 2A, 2D) may comprise a first opening 98a (see FIGS. 1A, 2D) and a second opening 98b (see FIGS. 1A, 2D). However, additional openings 98 may also be formed through the powder receptacle 80 for coupling the powder receptacle 80 to the one or more duct lines 54.

Figure 2D:
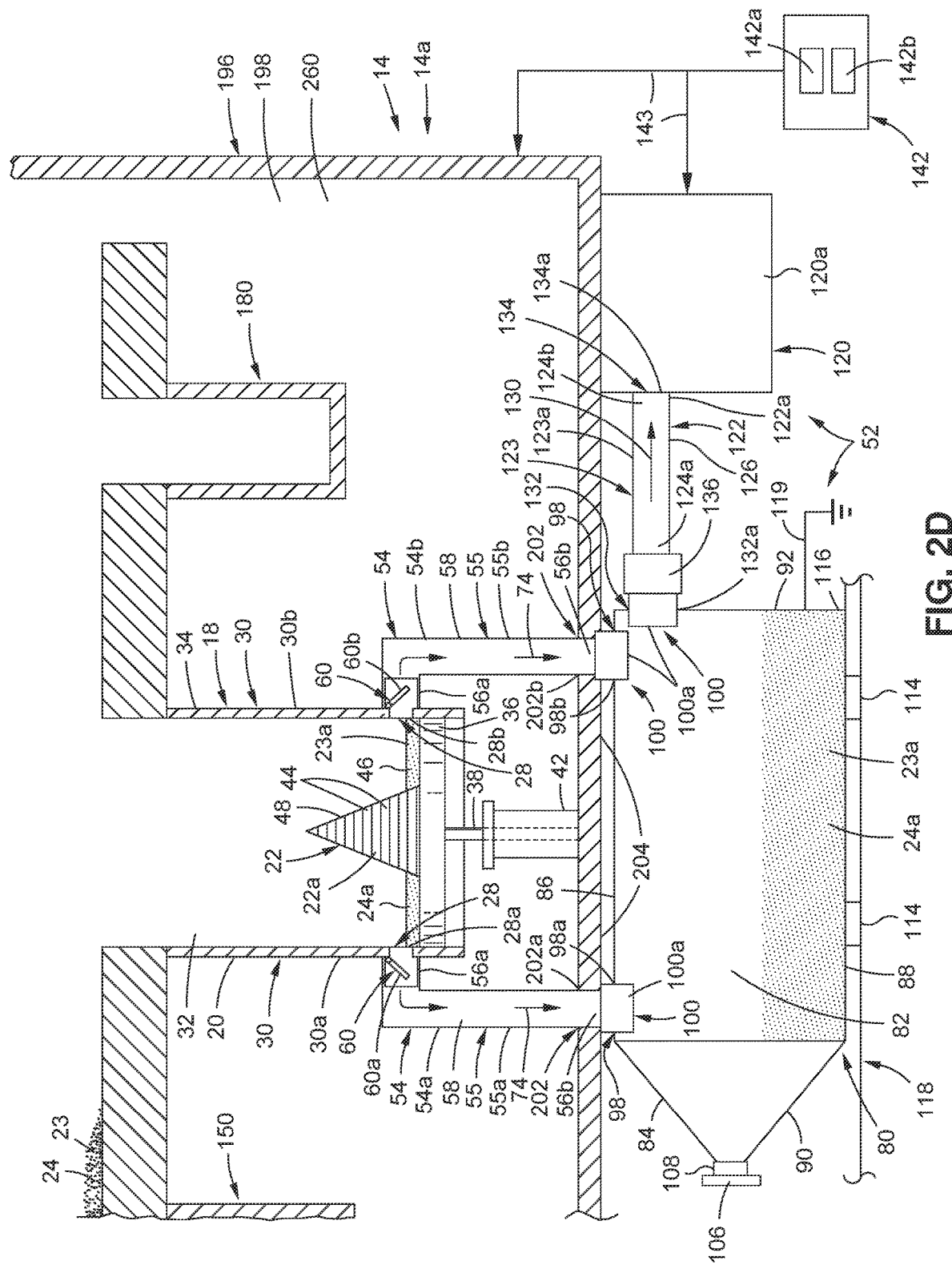
FIG. 2D is an illustration of an enlarged view of the vacuum assembly and additive manufacturing assembly of the additive manufacturing apparatus of FIG. 2A, showing unused powder removed by the vacuum assembly, and collected in a powder receptacle.

As shown in FIGS. 1A and 2A, each of the one or more coupling members 100 preferably comprises a quick disconnect coupling member 100a, or another suitable coupling member 100. The one or more coupling members 100 allow the powder receptacle 80 to be reversibly, or removably, attached to the one or more duct lines 54, such as the one or more flexible duct lines 55. As shown in FIG. 2D, the second end 56b of each of the one or more duct lines 54, such as the one or more flexible duct lines 55, is coupled to the powder receptacle 80, via the one of one or more coupling members 100, such as quick disconnect coupling member 100a. Each of the one or more coupling members 100 (see FIG. 2A) is fitted in, or is configured to be fitted in, one of the respective openings 98 (see FIG. 2A) formed in the powder receptacle 80 (see FIG. 2A). When the powder receptacle 80 is disconnected from the second end 56b of each of the one or more duct lines 54, such as the one or more flexible duct lines 55, each opening 98 may have a closure element 102 (see FIG. 1A), such as a spring-loaded closure element 102a (see FIG. 1A), designed to close each opening 98 and create an airtight seal 104 (see FIG. 1A), to prevent any of the unused build material 23a (see FIG. 1A), such as unused powder 24a (see FIG. 1A), in the powder receptacle 80 from escaping or leaking out.

As shown in FIGS. 1A, 2A, the powder receptacle 80 preferably has an output nozzle 106 coupled to, or formed on, the exterior 84 of the powder receptacle 80. As shown in FIG. 2A, the output nozzle 106 is located at the front end 90 of the powder receptacle 80. However, the output nozzle 106 may be located at another suitable location on the powder receptacle 80. The output nozzle 106 may comprise a valve 108 (see FIGS. 1A, 2A) to open and to close the output nozzle 106. The output nozzle 106 facilitates, or is configured to facilitate, the transfer of the unused build material 23a, such as unused powder 24a, collected in the powder receptacle 80, to a powder sieve apparatus 110 (see FIG. 1B), which is separate from the AM apparatus 10, but part of the AM system 16. The output nozzle 106 attaches to, or is configured for attachment to, an input nozzle 112 (see FIG. 1B, FIG. 2A) of the powder sieve apparatus 110 (see FIG. 1B, FIG. 2A), when the unused build material 23a, such as unused powder 24a, is transferred from the powder receptacle 80 to the powder sieve apparatus 110 for sieving and reuse, or possible reuse.

The bottom end 88 (see FIG. 2A) of the powder receptacle 80 (see FIG. 2A) may have a plurality of base attachment portions 114 (see FIGS. 1A, 2A) formed at, or extending from a base 116 (see FIGS. 1A, 2A) of the powder receptacle 80. The plurality of base attachment portions 114 may be welded to the base 116 of the powder receptacle 80, or attached in another suitable manner. The plurality of base attachment portions 114 attach to, or are configured to attach to, a mobile transporting apparatus 118 (see FIGS. 1B, 2A), which is separate from the AM apparatus 10, but part of the AM system 16. The plurality of base attachment portions 114 of the powder receptacle 80 are designed for attachment to the mobile transporting apparatus 118. The mobile transporting apparatus 118 (see FIGS. 1B, 2A) may comprise, for example, a dolly 118a (see FIGS. 1B, 2A), a pallet jack 118b (see FIG. 1B), a forklift 118c (see FIG. 1B), or another suitable mobile transporting apparatus 118.

After the powder receptacle 80 is full, or after the one or more parts 22 are built, the powder receptacle 80 may be disconnected from the one or more duct lines 54, such as the one or more flexible duct lines 55. The powder receptacle 80 may be coupled or attached to the mobile transporting apparatus 118, or may already be coupled, or attached, to the mobile transporting apparatus 118, via the plurality of base attachment portions 114. The powder receptacle 80 may be transported, via the mobile transporting apparatus 118, to the powder sieve apparatus 110 (see FIG. 1B) for sieving and reuse, or possible reuse, of the unused build material 23a, such as the unused powder 24a. Alternatively, the powder receptacle 80 may be transported to another apparatus or device of the AM system 16, or another system. The powder receptacle 80 may further comprise a ground connection element 119 (see FIG. 2A) to connect to, or configured to connect to, a ground facility.

As shown in FIGS. 1A-1B and 2A, the vacuum assembly 52 further comprises a vacuum apparatus 120 that is coupled to, and in flow communication with, the powder receptacle 80, via one or more vacuum duct lines 122. The vacuum apparatus 120 preferably comprises a vacuum pump 120a (see FIGS. 1A, 2A), or another suitable vacuum apparatus 120.

The vacuum assembly 52 may have one vacuum duct line 122, two vacuum duct lines 122, or more than two vacuum duct lines 122. Each of the one or more vacuum duct lines 122 preferably comprises a flexible vacuum duct line 123 (see FIG. 1A). Each of the one or more vacuum duct lines 122, such as the one or more flexible vacuum duct lines 123, has a first end 124a (see FIGS. 2D, 2E), a second end 124b (see FIGS. 2D, 2E), and an elongated body 126 (see FIGS. 2D, 2E) formed between the first end 124a and the second end 124b. Each of the one or more vacuum duct lines 122, such as the one or more flexible vacuum duct lines 123, is preferably hollow or non-solid, so that vacuum air 128 (see FIG. 1A) can be pulled from the powder receptacle 80 through the one or more vacuum duct lines 122, such as the one or more flexible vacuum duct lines 123, by the vacuum apparatus 120, in a pulling a vacuum direction 130 (see FIG. 2A) in the first vacuum duct line 122a (see FIG. 2A) and in a pulling a vacuum direction 131 (see FIG. 2E) in the second vacuum duct line 122b (see FIG. 2E).

Figure 2E:
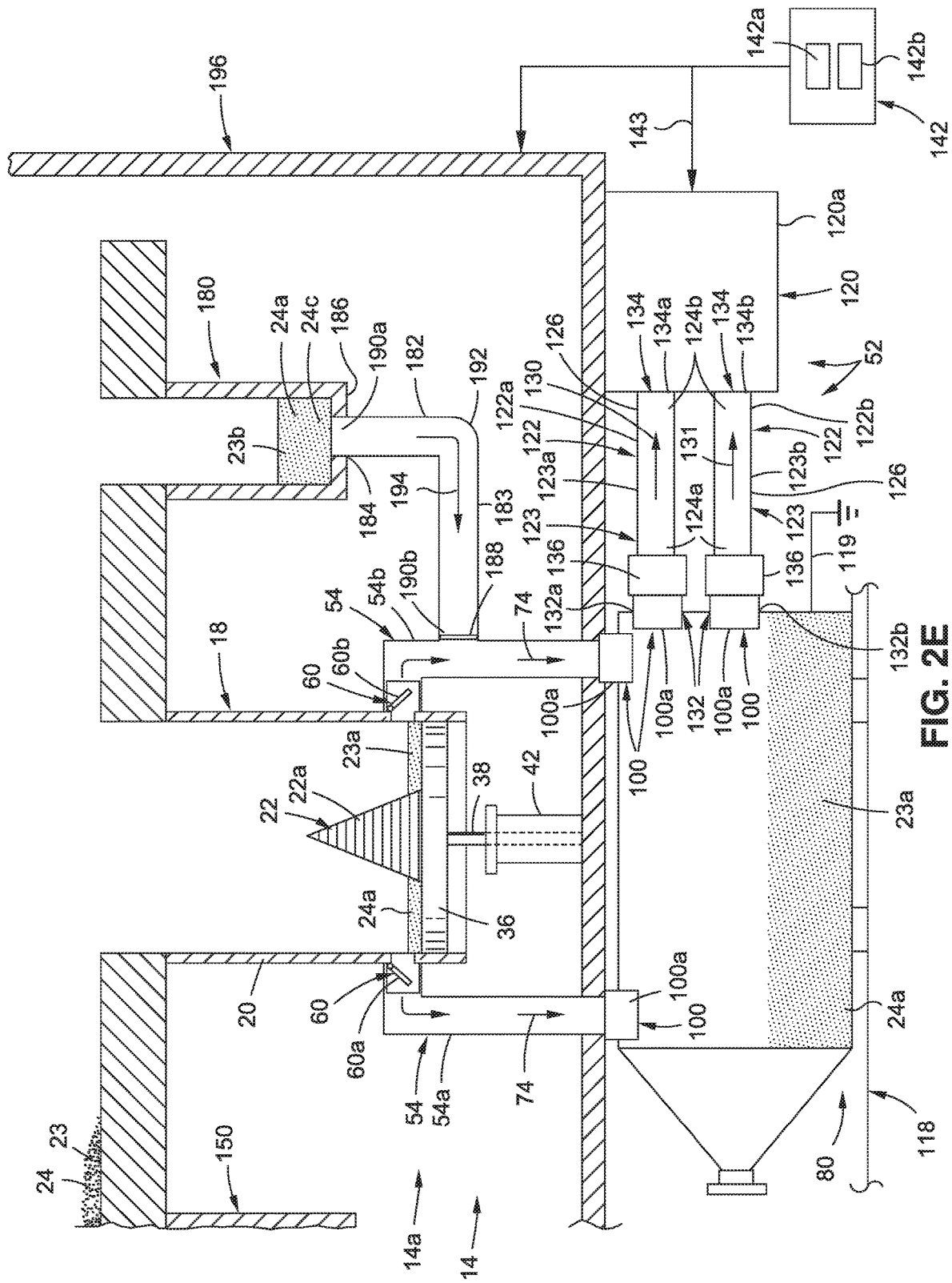
FIG. 2E is an illustration of an enlarged view of the vacuum assembly and additive manufacturing assembly of FIG. 2D, with the addition of an overflow duct line coupled between a powder overflow chamber and a duct line, and with the addition of another vacuum duct line coupled between a powder receptacle and a vacuum apparatus.

As shown in FIG. 2A, the vacuum assembly 52 has one vacuum duct line 122, such as one flexible vacuum duct line 123, for example, a first vacuum duct line 122a. The first end 124a (see FIG. 2D) of the first vacuum duct line 122a (see FIGS. 2A, 2D), is coupled, or attached, to a vacuum duct line opening 132 (see FIGS. 1A, 2A, 2D), such as a first vacuum duct line opening 132a (see FIGS. 1A, 2A, 2D), formed through the back end 92 (see FIGS. 2A, 2D), or another portion, of the powder receptacle 80. The second end 124b (see FIG. 2D) of the first vacuum duct line 122a is coupled, or attached to, a vacuum port 134 (see FIGS. 1A, 2A, 2D), such as a first vacuum port 134a (see FIGS. 1A, 2A, 2D), formed in the vacuum apparatus 120 (see FIGS. 1A, 2A, 2D), such as the vacuum pump 120a (see FIGS. 1A, 2A, 2D). As shown in FIGS. 2A, 2D, and 2E, the powder receptacle 80 further comprises one or more additional coupling members 100, such as quick disconnect coupling members 100a, or another suitable coupling member, allowing the powder receptacle 80 to be reversibly attached to the one or more vacuum duct lines 122, such as the first vacuum duct line 122a and the second vacuum duct line 122b (see FIG. 2E), directly or indirectly, via a filter element 136. The one or more coupling members 100 allow the powder receptacle 80 to be reversibly, or removably, attached to the one or more vacuum duct lines 122, such as the one or more flexible vacuum duct lines 123. As shown in FIGS. 2D and 2E, the first end 124a of the vacuum duct line 122, such as the first vacuum duct line 122a, is coupled to the powder receptacle 80, via the filter element 136, and via the coupling member 100, such as quick disconnect coupling member 100a, where the coupling member 100 is fitted in, or is configured to be fitted in, the vacuum duct line opening 132, such as the first vacuum duct line opening 132a, formed in the back end 92 of the powder receptacle 80. As shown in FIG. 2E, the first end 124a of the vacuum duct line 122, such as the second vacuum duct line 122b, is coupled to the powder receptacle 80, via the filter element 136, and via the coupling member 100, such as quick disconnect coupling member 100a, where the coupling member 100 is fitted in, or is configured to be fitted in, the vacuum duct line opening 132, such as a second vacuum duct line opening 132b, formed in the back end 92 of the powder receptacle 80. When the powder receptacle 80 is disconnected from the first end 124a of each of the one or more vacuum duct lines 122, such as the one or more flexible vacuum duct lines 123, each vacuum duct line opening 132 may have a closure element 102 (see FIG. 1A), such as a spring-loaded closure element 102a (see FIG. 1A), designed to close each vacuum duct line opening 132 and create an airtight seal 104 (see FIG. 1A), to prevent any of the unused build material 23a (see FIG. 1A), such as unused powder 24a (see FIG. 1A), in the powder receptacle 80 from escaping or leaking out.

As shown in FIG. 2E, the vacuum assembly 52 has two vacuum duct lines 122, such as flexible vacuum duct lines 123, for example, the first vacuum duct line 122a and the second vacuum duct line 122b. As further shown in FIG. 2E, the first end 124a of the second vacuum duct line 122b is coupled, or attached, via the filter element 136 and the coupling member 100, to the vacuum duct line opening 132, such as the second vacuum duct line opening 132b, formed in the back end 92, or another portion, of the powder receptacle 80. As further shown in FIG. 2E, the second end 124b of the second vacuum duct line 122b is coupled, or attached to, a vacuum port 134, such as a second vacuum port 134b (see also FIG. 1A), formed in the vacuum apparatus 120, such as the vacuum pump 120a.

Each of the one or more vacuum duct lines 122, such as the flexible vacuum duct lines 123, preferably has the filter element 136 (see FIGS. 1A, 2A, 2D, 2E) that may be coupled at the first end 124a (see FIG. 2D) of the one or more vacuum duct lines 122, such as the flexible vacuum duct lines 123. The filter element 136 (see FIG. 2DF) may be further coupled to the coupling member 100, such as the quick disconnect coupling member 100a, fitted in the vacuum duct line opening 132 (see FIG. 3D), which vacuum duct line opening 132 is formed through the back end 92 (see FIG. 2D) of the powder receptacle 80 (see FIG. 2D). The first end 124a of each of the one or more vacuum duct lines 122, such as the one or more flexible vacuum duct lines 123, may be coupled directly to the respective coupling member 100, such as the quick disconnect coupling member 100a, fitted in the vacuum duct line opening 132 formed through the back end 92, or through another portion, of the powder receptacle 80, or may be coupled indirectly via the filter element 136. The filter element 136 is preferably easily connected to and disconnected from the coupling member 100 and the powder receptacle 80, and is preferably easily connected to and disconnected from the vacuum duct line 122. The filter element 136 is a removable, cleanable, and replaceable element that may need to be removed, cleaned, and/or replaced between every one, two, three, or more build operations 26 (see FIGS. 1A-1B), as the filter element 136 may become clogged or laden with build material 23, such as powder 24 after such build operations 26. The filter element 136 preferably has a filter mesh size in a range of from 10 (ten) microns to 25 (twenty-five) microns. A filter mesh size in a range of 10 microns to 25 microns is preferable to a filter mesh size of less than 10 microns, as a filter mesh size of less than 10 microns may be more expensive or costly to obtain, and may clog or need to be replaced more often. A filter mesh size in a range of 10 microns to 25 microns is preferable to a filter mesh size of greater than 25 microns, as a filter mesh size of greater than 25 microns may be too large and may allow the build material 23, such as the powder 24, to flow through the filter element 136. For example, the build material 23, such as the powder 24, may have a particle size of 40 (forty) microns, and a filter mesh size of about 40 microns or more would allow the build material 23, such as the powder 24 having a particle size of 40 microns to flow through the filter and possibly damage the vacuum apparatus 120 (see FIG. 2A), such as the vacuum pump 120a (see FIG. 2A).

The vacuum assembly 52 of the additive manufacturing apparatus 10 provides for an automated removal 138 (see FIGS. 1A-1B) of the unused build material 23a, such as the unused powder 24a, remaining after the build operation 26, from the build chamber 20 into the powder receptacle 80. This avoids a manual removal 139 (see FIGS. 1A-1B) of the unused build material 23a, such as the unused powder 24a, from the build chamber 20. The vacuum assembly 52 of the additive manufacturing apparatus 10 further provides for an automated collection 140 (see FIGS. 1A-1B) of the unused build material 23a, such as the unused powder 24a, in the powder receptacle 80, from the build chamber 20. This avoids a manual collection 141 (see FIGS. 1A-1B) of the unused build material 23a, such as the unused powder 24a, from the build chamber 20.

As shown in FIGS. 1A-1B and 2A, the AM apparatus 10 further comprises a power source 142 to power the AM apparatus 10. The power source 142 is preferably coupled, or connected, via one or more connection elements 143 (see FIG. 2A), to the AM assembly 14, and to the vacuum assembly 52. The power source 142 preferably includes an electrical power source 142a (see FIGS. 1B, 2A), a vacuum power source 142b (see FIGS. 1B, 2A), or another suitable power source. The connection elements 143 may comprise wired power connection elements or wireless power connection elements.

As shown in FIGS. 1A-1B and 2A, the AM apparatus 10 further comprises a control system 144 to control the AM apparatus 10. The control system 144 is preferably coupled, or connected, via one or more connection elements 145 (see FIG. 2A) to the AM assembly 14, and may also be coupled directly or indirectly to the vacuum assembly 52. The control system 144 preferably includes a computer 146 (see FIGS. 1A-1B, 2A) with a software program 148 (see FIGS. 1A-1B, 2A), such as CAD (computer-aided design), 3D CAD (three-dimensional computer-aided design), or another suitable software program 148. The connection element 145 may comprise wired control connection elements or wireless control connection elements.

As shown in FIGS. 1B and 2A, the AM system 16 for the AM process 12 having the AM apparatus 10a with the AM assembly 14a further comprises a powder delivery assembly 150 to supply the build material 23, such as powder 24, to the build assembly 18. As further shown in FIGS. 1B and 2A, the powder delivery assembly 150 comprises a powder reservoir 152 containing a powder feed supply 154 of powder 24. The powder delivery assembly 150 further comprises a powder leveling apparatus 156 (see FIGS. 1B, 2A), such as in the form of a roller apparatus, a rake apparatus, or another suitable leveling apparatus, to deliver or feed the build material 23, such as the powder 24, in a horizontal powder feed direction 157 (see FIG. 2A), across a powder supply platform (see FIG. 2A) to the build chamber 20. As shown in FIG. 2A, the powder delivery assembly 150 may further comprise a powder supply piston 158 that moves in an upward powder supply direction 159 to move the build material 23, such as the powder 24, up to the powder supply platform 160. The powder supply piston 158 moves upwardly and downwardly as needed.

As shown in FIGS. 1B and 2A, the AM assembly 14a of the AM system 16 preferably further comprises an energy delivery assembly 162 to melt the build material 23, such as the powder 24, in the build chamber 20 used to build the one or more parts 22, during the build operation 26. As further shown in FIGS. 1B and 2A, the energy delivery assembly 162 comprises an energy source 164, for example, in the form of a laser apparatus 166 that emits or generates a laser beam 168 to melt the build material 23, such as the powder 24, in the build chamber 20. The laser apparatus 166 may comprise a $CO_2$ laser, a YAG pulsed laser, or another suitable laser apparatus 166. Alternatively, the energy source 164 may comprise an electron beam (EB) apparatus 170 (see FIG. 1B) that emits or generates an electron beam (EB) 172 (see FIG. 1B) to melt the build material 23, such as the powder 24, in the build chamber 20. Alternatively, the energy source 164 may comprise another suitable energy source 164. As one example, the AM process 12 (see FIG. 1B) may comprise be the selective laser melting (SLM) AM process 13 (see FIG. 1B) that uses a laser beam 168 of high power as its energy source 164. The SLM AM process 13 manufactures the part 22 by melting powder 24, such as metal powder 24b (see FIG. 1B) layer 44 (see FIG. 1B) by layer 44 with the laser beam 168 (see FIGS. 1B, 2A), for example, under control by the control system 144 (see FIGS. 1B, 2A) with the computer 146 (see FIGS. 1B, 2A). The SLM AM process 13 fully melts the metal powder 24b into a solid homogeneous metal mass. As further shown in FIGS. 1B and 2A, the energy delivery assembly 162 preferably further comprises a scanner system 174, such as including a scanning mirror 176, for example, an X-Y scanning mirror, or another suitable scanning element, and preferably further comprises one or more optics devices 178, such as one or more focus lenses 178a, or another suitable optics device 178.

As shown in FIGS. 1B and 2A, the AM assembly 14a of the AM system 16 preferably further comprises a powder overflow chamber 180, to store any build material 23, such as powder 24, that overflows from the build chamber 20 into the powder overflow chamber 180. The powder overflow chamber 180 (see FIGS. 1B, 2E) may include one or more overflow chamber openings 184 (see FIG. 1B) formed through one or more walls 186 (see FIG. 2E) of the powder overflow chamber 180. Optionally, one or more overflow duct lines 182 (see FIGS. 1B, 2E), or tubes, such as one or more flexible overflow duct lines 183 (see FIG. 2E), may be coupled between the one or more overflow chamber openings 184 (see FIG. 2E) formed through one or more walls 186 (see FIG. 2E) of the powder overflow chamber 180, and the one or more duct lines 54, or the powder receptacle 80. The one or more overflow duct lines 182 are discussed in further detail below with respect to FIG. 2E.

As shown in FIGS. 1B and 2A, the AM assembly 14a of the AM system 16 preferably further comprises a housing structure 196. As shown in FIG. 2A, the housing structure 196 houses, or is configured to house, or contain, the build assembly 18, the powder delivery assembly 150, the energy delivery assembly 162, and the powder overflow chamber 180, and at least the one or more duct lines 54 and, if present, the one or more overflow duct lines 182 (see FIG. 2E) of the vacuum assembly 52. As shown in FIG. 2A, the powder receptacle 80 and the vacuum apparatus 120 of the vacuum assembly 52 are preferably located outside of the housing structure 196. The housing structure 196 comprises an interior 198 (see FIGS. 2A, 2D), an exterior 200 (see FIGS. 2A, 2D), and one or more housing openings 202 (see FIGS. 1B, 2A, 2D) formed through portions 204 (see FIG. 2D) of the exterior 200. The powder collection and removal system 50 (see FIGS. 1B, 2A) of the AM system 16, comprises the vacuum assembly 52 coupled to the build chamber 20 of the AM apparatus 10a, via the one or more housing openings 202 (see FIG. 2A).

As shown in FIGS. 1B and 2A, the AM assembly 14a of the AM system 16 preferably further comprises an environmental control assembly 206. As shown in FIG. 2A, the environmental control assembly 206 may also be housed or contained within the interior 198 of the housing structure 196. The environmental control assembly 206 may control the temperature within the AM assembly 14, such as the AM assembly 14a, and in particular, in the build chamber 20, and on the build platform 36 and powder bed 46. Further, the environmental control assembly 206 may maintain a level of oxygen within the AM assembly 14, such as the AM assembly 14a, and in particular, in the build chamber 20, within a selected level.

Now referring to FIGS. 2B and 2C, FIG. 2B is an illustration of an enlarged view of circle 2B of FIG. 2A, showing an exemplary version of the check valve assembly 60, such as the first check valve assembly 60a, of the AM apparatus 10 (see FIGS. 1A, 2A) of the disclosure, and FIG. 2C is an illustration of an enlarged view of circle 2C of FIG. 2A, showing an exemplary version of the check valve assembly 60, such as the second check valve assembly 60b, of the AM apparatus 10 (see FIGS. 1A, 2A) of the disclosure. FIG. 2B shows duct line 54, such as first duct line 54a, preferably in the form of a flexible duct line 55, such as a first flexible duct line 55a, coupled to the build chamber opening 28, such as the first build chamber opening 28a, formed in the wall 30, such as the first wall 30a, of the build chamber 20. FIG. 2C shows duct line 54, such as second duct line 54b, preferably in the form of flexible duct line 55, such as a second flexible duct line 55b, coupled to the build chamber opening 28, such as the second build chamber opening 28b, formed in the wall 30, such as the second wall 30b, of the build chamber 20.

FIGS. 2B-2C show the duct line 54 having the elongated body 58 and having the flow path direction 74 through the interior of the duct line 54. FIGS. 2A-2B further show the interior portion 32 and the exterior portion 34 of the build chamber 20, and partially show the build platform 36 in the interior portion 32 of the build chamber 20. After one or more parts 22 (see FIG. 2D) are built with the build material 23 (see FIG. 2D), such as powder 24 (see FIG. 2D), in the build operation 26 (see FIGS. 1A-1B) of the AM process 12 (see FIGS. 1A-1B), and the build platform 36 (see FIGS. 2B-2D) is lowered downwardly with the build piston 38 (see FIG. 2D), a bottom portion 29 (see FIGS. 2B-2C) the build chamber opening 28 (see FIGS. 2B-2C) is preferably aligned with, or level to, a ground floor position 40 (see FIGS. 2B-2C) of the build platform 36 (see FIGS. 2B-2C) in the build chamber 20. The one or more build chamber openings 28 (see FIGS. 2B-2C) may be formed adjacent to, or below, the build platform 36 at the ground floor position 40, such as when the build platform 36 is lowered as far as allowed by the build piston 38.

As further shown in FIGS. 2B-2C, the check valve assembly 60 comprises the check valve 62, such as the pneumatic flapper check valve 62a, that is actuated with an actuator 64, such as a pneumatic actuator 64a. The check valve 62 (see FIGS. 2B-2C) has a first side 76a (see FIGS. 2B-2C) and a second side 76b (see FIGS. 2B-2C). With the check valve assembly 60, flow of the unused build material 23a, such as unused powder 24a, is preferably only possible in one direction from the first side 76a of the check valve 62, such as the pneumatic flapper check valve 62a, through a flow gap 78 (see FIGS. 2B-2C). As shown in FIGS. 2B-2C, the check valve 62, such as the pneumatic flapper check valve 62a, moves, or is configured to move back and forth, from the open position 68 to the closed position 66, to prevent, or minimize, any back flow of the unused build material 23a (see FIGS. 2A, 2D), such as unused powder 24a (see FIGS. 2A, 2D).

In addition to the check valve assembly 60 (see FIGS. 2B-2C), or as an alternative to the check valve assembly 60, a latch element 72 (see FIG. 1A), such as a spring-loaded latch, may be coupled to each of the build chamber openings 28 (see FIGS. 1A-1B), and may be controlled to open and to close, to allow, or to prevent, flow of the unused build material 23a (see FIGS. 1A-1B), such as the unused powder 24a (see FIGS. 1A-1B), out of the build chamber 20. The unused build material 23a, such as the unused powder 24a, flows out of the build chamber 20 and through each duct line 54 (see FIGS. 2B-2C), such as each flexible duct line 55 (see FIGS. 2B-2C), in the flow path direction 74 (see FIGS. 2B-2C).

Now referring to FIG. 2D, FIG. 2D is an illustration of an enlarged view of the vacuum assembly 52 and the AM assembly 14, such as in the form of AM assembly 14a, of the AM apparatus 10 of FIG. 2A, and showing unused build material 23a, such as unused powder 24a, that has been removed by the vacuum assembly 52 and collected in the powder receptacle 80.

FIG. 2D further shows the part 22, such as the built part 22a, on the build platform 36 in the build chamber 20 of the build assembly 18, with the build piston 38 actuated by the build piston actuator 42 to its lowest level or ground floor position 40 (see FIGS. 2B-2C). FIG. 2D shows the interior portion 32 of the build chamber 20 substantially empty with much of the unused build material 23a, such as unused powder 24a, removed, as compared to the interior portion 32 in FIG. 2A which is filled with the unused build material 23a, such as unused powder 24a. FIG. 2D shows only a small portion of the unused build material 23a, such as unused powder 24a, still in the build chamber 20, and this small portion will also be removed by the vacuum assembly 52.

FIG. 2D shows most of the unused build material 23a, such as unused powder 24a, removed from the build chamber 20, by the vacuum assembly 52, and collected in the powder receptacle 80, via the duct lines 54, such as first duct line 54a and second duct line 54b, in the flow path direction 74. Preferably, the duct lines 54 are flexible duct lines 55 (see FIG. 2D), such as first flexible duct line 55a (see FIG. 2D) and second flexible duct line 55b (see FIG. 2D). The vacuum assembly 52, removes, or is configured to remove, all, or substantially all, of the unused build material 23a, such as the unused powder 24a, from the build chamber 20, via the build chamber openings 28, such as first build chamber opening 28a and second build chamber opening 28b, formed through the walls 30, such as first wall 30a and second wall 30b, of the build chamber 20, and via the check valve assemblies 60, such as first check valve assembly 60a and second check valve assembly 60b, coupled to the first duct line 54a and the second duct line 54b, respectively.

FIG. 2D further shows the housing structure 196 with the interior 198, exterior 200, and housing openings 202, such as first housing opening 202a and second housing opening 202b, formed in portions 204 of the housing structure 196. FIG. 2D further shows the powder delivery assembly 150 with the build material 23, such as powder 24, the powder overflow chamber 180 which is empty, the mobile transporting apparatus 118 supporting the powder receptacle 80. FIG. 2D further shows the powder receptacle 80 of the vacuum assembly 52 coupled to the duct lines 54, via the coupling members 100, such as quick disconnect coupling members 100a, positioned in openings 98, such as first opening 98a and second opening 98b, of the powder receptacle 80. As further shown in FIG. 2D, the powder receptacle 80 includes the interior 82, the exterior 84, the top end 86, the bottom end 88, the front end 90 with output nozzle 106 and valve 108, the back end 92, the base attachment portions 114 extending from the base 116, and the ground connection element 119 coupled to the powder receptacle 80.

FIG. 2D further shows one vacuum duct line 122, such as first vacuum duct line 122a, in the form of flexible vacuum duct line 123, such as first flexible vacuum duct line 123a, coupled, or attached, between the powder receptacle 80 and the vacuum apparatus 120, such as the vacuum pump 120a. As shown in FIG. 2D, the first vacuum duct line 122a, such as first flexible vacuum duct line 123a, has the first end 124a coupled, via the filter element 136, to the coupling member 100, such as the quick disconnect coupling member 100a, fitted in the vacuum duct line opening 132, such as the first vacuum duct line opening 132a, formed through the back end 92 of the powder receptacle 80. As further shown in FIG. 2D, the first vacuum duct line 122a, such as first flexible vacuum duct line 123a, has a second end 124b coupled to a vacuum port 134, such as a first vacuum port 134a, formed in the vacuum apparatus 120. FIG. 2E shows the vacuum apparatus 120 pulling a vacuum in a pulling a vacuum direction 130 in the first vacuum duct line 122a. The vacuum apparatus 120 may be powered with a power source 142 having a vacuum power source 142b (see FIG. 2D), via connection element 143 (see FIG. 2D). The power source 142 (see FIG. 2D) may further comprise an electrical power source 142a (see FIG. 2D) for supplying power via connection element 143 (see FIG. 2D), to the AM assembly 14, such as AM assembly 14a.

Now referring to FIG. 2E, FIG. 2E is an illustration of an enlarged view of the vacuum assembly 52 and the AM assembly 14, such as in the form of AM assembly 14a, of FIG. 2D, with the addition of an overflow duct line 182 coupled between the powder overflow chamber 180 and the duct line 54, such as second duct line 54b, and with the addition of another vacuum duct line 122, such as a second vacuum duct line 122b, coupled between the powder receptacle 80 and the vacuum apparatus 120, such as vacuum pump 120a.

As shown in FIG. 2E, the vacuum assembly 52 may further comprise one or more overflow duct lines 182 in flow communication with, and coupled to, the powder overflow chamber 180. As further shown in FIG. 2E, each of the one or more overflow duct lines 182, such as the one or more flexible overflow duct lines 183, has a first end 190a, a second end 190b, and an elongated body 192 formed between the first end 190a and the second end 190b. Each of the one or more overflow duct lines 182, such as the one or more flexible overflow duct lines 183, is preferably hollow or non-solid, so that overflow build material 23b (see FIG. 2E), such as unused powder 24a (see FIG. 2E), in the form of overflow powder 24c (see FIG. 2E), accumulated in the powder overflow chamber 180 can flow through the interior of the one or more overflow duct lines 182 in a flow path direction 194 (see FIG. 2E). As shown in FIG. 2E, the first end 190a of the overflow duct line 182, such as the flexible overflow duct line 183, is coupled, or attached, to an overflow chamber opening 184 formed in a wall 186 of the powder overflow chamber 180.

Preferably, the first end 190a of the overflow duct line 182, such as the flexible overflow duct line 183, is welded, or fastened with a silicone o-ring, to the overflow chamber opening 184 formed in the wall 186 of the powder overflow chamber 180, to ensure a sealed interface between the first end 190a and the wall 186 of the powder overflow chamber 180. Each of the one or more overflow duct lines 182, such as the one or more flexible overflow duct lines 183, may optionally have at the first end 190a, a check valve assembly 60, as discussed in detail above, or a latch element 72 (see FIG. 1A). The overflow build material 23b, such as the unused powder 24a, in the form of overflow powder 24c, flows out of the powder overflow chamber 180 and through each overflow duct line 182, such as each flexible overflow duct line 183, in the flow path direction 194 (see FIG. 2E).

As further shown in FIG. 2E, the second end 190b of the overflow duct line 182, such as the flexible overflow duct line 183, may be coupled, or attached, to a duct line 54, such as second duct line, 54b, or another duct line 54, via an overflow duct line flow connection element 188 that connects the interior of the overflow duct line 182 to the interior of the duct line 54. As shown in FIG. 2E, the duct line 54, such as second duct line 54b, is coupled between the build chamber 20 of the build assembly 18 and the powder receptacle 80, via the coupling member 100, such as the quick disconnect coupling member 100a. Alternatively, the second end 190b of each of the one or more overflow duct lines 182, such as the one or more flexible overflow duct lines 183, may be coupled, or attached, directly to the powder receptacle 80, via one of the one or more coupling members 100, as discussed above.

FIG. 2E further shows two vacuum duct lines 122, such as flexible vacuum duct lines 123, coupled, or attached between the powder receptacle 80 and the vacuum apparatus 120, such as the vacuum pump 120a. As shown in FIG. 2E, the first vacuum duct line 122a, such as first flexible vacuum duct line 123a, has the first end 124a coupled to the coupling member 100, such as the quick disconnect coupling member 100a, fitted in the vacuum duct line opening 132, such as the first vacuum duct line opening 132a, formed through the back end 92 of the powder receptacle 80, via the filter element 136. As further shown in FIG. 2E, the second vacuum duct line 122b, such as second flexible vacuum duct line 123b, has the first end 124a coupled to the coupling member 100, such as the quick disconnect coupling member 100a, fitted in the vacuum duct line opening 132, such as the second vacuum duct line opening 132b, formed through the back end 92 of the powder receptacle 80, via the filter element 136. As shown in FIG. 2E, the first vacuum duct line 122a, such as first flexible vacuum duct line 123a, has the second end 124b coupled to the vacuum port 134, such as a first vacuum port 134a, formed in the vacuum apparatus 120. As further shown in FIG. 2E, the second vacuum duct line 122b, such as second flexible vacuum duct line 123b, has the second end 124b coupled to the vacuum port 134, such as a second vacuum port 134b, formed in the vacuum apparatus.

FIG. 2E shows the vacuum apparatus 120 pulling a vacuum in a pulling a vacuum direction 130 in the first vacuum duct line 122a and pulling a vacuum in a pulling a vacuum direction 131 in the second vacuum duct line 122b. The vacuum apparatus 120 may be powered with a power source 142 having a vacuum power source 142b, via connection element 143.

FIG. 2E further shows the part 22, such as the built part 22a, on the build platform 36 in the build chamber 20 with the build piston 38 actuated by the build piston actuator 42 to its lowest level or ground floor position 40 (see FIGS. 2B-2C). FIG. 2E shows most of the unused build material 23a, such as unused powder 24a, removed from the build chamber 20, by the vacuum assembly 52, and collected in the powder receptacle 80, via the first duct line 54a and the second duct line 54b, in the flow path direction 74. The vacuum assembly 52, removes, or is configured to remove, all, or substantially all, of the unused build material 23a, such as the unused powder 24a, from the build chamber 20. FIG. 2E shows most of the unused build material 23a, such as the unused powder 24a, collected in the powder receptacle 80. In addition, with this version of the AM assembly 14, such as AM assembly 14a, the vacuum assembly 52, removes, or is configured to remove, all, or substantially all, of the overflow build material 23b, such as overflow powder 24c, from the powder overflow chamber 180, via the one or more overflow duct lines 182 coupled to the one or more duct lines 54, or directly coupled to the powder receptacle 80.

FIG. 2E further shows the housing structure 196, the powder delivery assembly 150 with the build material 23, such as powder 24, the check valve assemblies 60, such as first check valve assembly 60a and second check valve assembly 60b coupled to the first duct line 54a and the second duct line 54b, respectively, the mobile transporting apparatus 118 supporting the powder receptacle 80, and the ground connection element 119 coupled to the powder receptacle 80.

Now referring to FIG. 2F, FIG. 2F is an illustration of an enlarged top sectional view of an exemplary version of the vacuum assembly 52 of the disclosure with four duct lines 54, such as four flexible duct lines 55, coupled between the build chamber 20 and the powder receptacle 80. FIG. 2F shows four build chamber openings 28, four walls 30, the interior portion 32, and the exterior portion 34, of the build chamber 20. FIG. 2F further shows the top end 86, the front end 90, and the back end 92 of the powder receptacle 80 positioned underneath the build chamber 20. FIG. 2F further shows a vacuum duct line 122, such as a first vacuum duct line 122a, and preferably comprising a flexible vacuum duct line 123, such as a first flexible vacuum duct line 123a, coupled, via the filter element 136, to the coupling member 100, such as quick disconnect coupling member 100a, fitted in the vacuum duct line opening 132, such as first vacuum duct line opening 132a, formed through the back end 92 of the powder receptacle 80.

FIG. 2F further shows a first duct line 54a, such as a first flexible duct line 55a, coupled to a first build chamber opening 28a formed in a first wall 30a of the build chamber 20. FIG. 2F further shows a second duct line 54b, such as a second flexible duct line 55b, coupled to a second build chamber opening 28b formed in a second wall 30b of the build chamber 20. FIG. 2F further shows a third duct line 54c, such as a third flexible duct line 55c, coupled to a third build chamber opening 28c formed in a third wall 30c of the build chamber 20. FIG. 2F further shows a fourth duct line 54d, such as a fourth flexible duct line 55d, coupled to a fourth build chamber opening 28d formed in a fourth wall 30d of the build chamber 20. Although four duct lines 54 coupled to four build chamber openings 28 are shown in FIG. 2F, the number of duct lines 54 and the number of build chamber openings 28 may be another suitable number, depending on the size of the build chamber 20, the size of the powder receptacle 80, or another factor in the additive manufacturing process 12.

Figure 3:
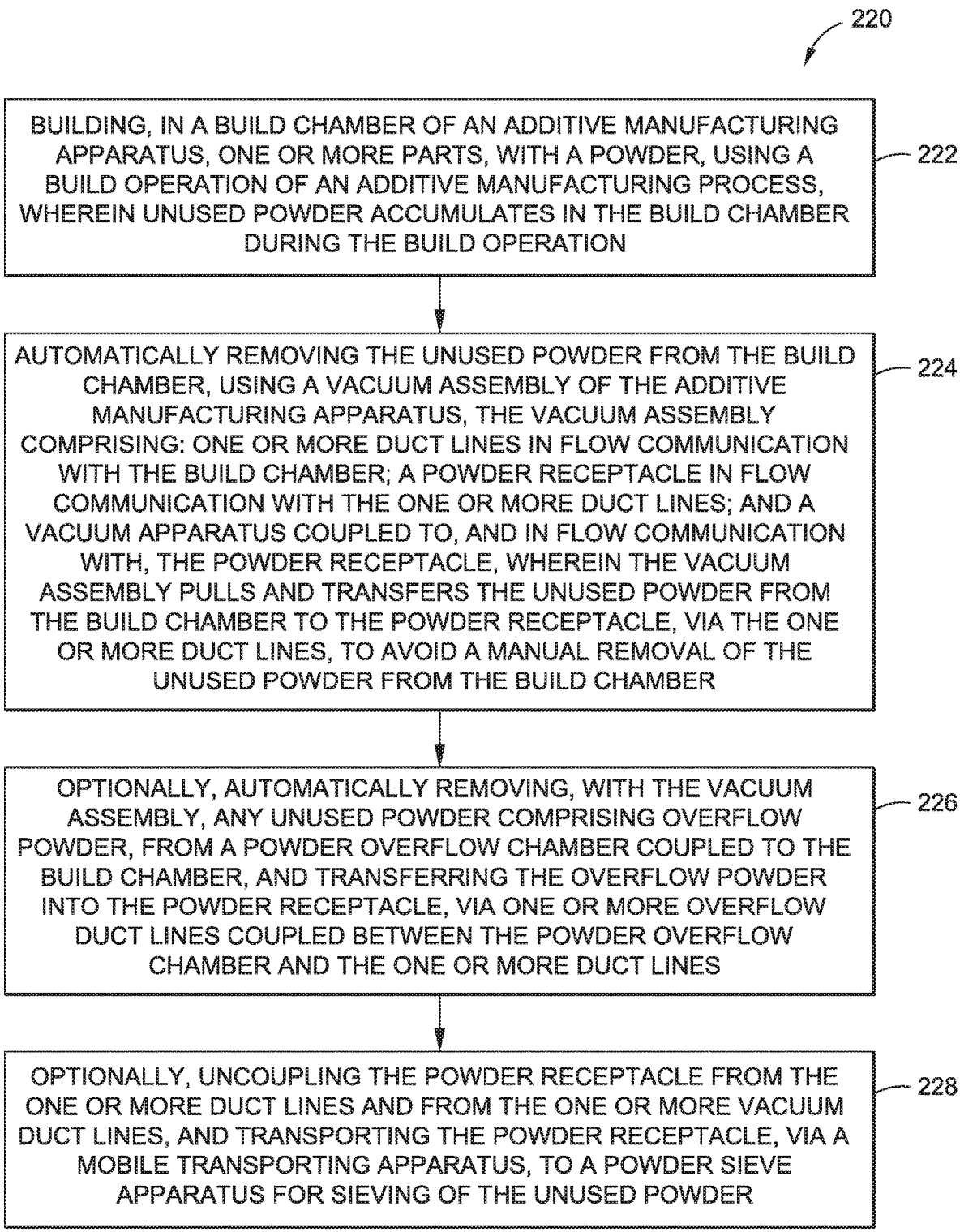
FIG. 3 is an illustration of a flowchart of steps of an exemplary version of a method of the disclosure.

Now referring to FIG. 3, FIG. 3 is an illustration of a flowchart of steps of an exemplary version of a method 220 of the disclosure. The blocks in FIG. 3 represent operations and/or portions thereof, and lines connecting the various blocks do not imply any particular order or dependency of the operations or portions thereof. FIG. 3 and the disclosure of the steps of the method 220 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

In another version, there is provided the method 220 (see FIG. 3) of using the additive manufacturing (AM) apparatus 10 (see FIGS. 1A-1B), 10a (see FIG. 1B), with a vacuum assembly 52 (see FIGS. 1A-1B), such as an integrated vacuum assembly 52a (see FIGS. 1A-1B), to automatically remove unused build material 23a (see FIGS. 1A-1B), such as unused powder 24a (see FIGS. 1A-1B), accumulated during an additive manufacturing (AM) process 12 (see FIGS. 1A-1B), such as a selective laser melting (SLM) AM process 13 (see FIGS. 1A-1B), or another suitable AM process 12.

As shown in FIG. 3, the method 220 further comprises the step 222 of building in the build chamber 20 (see FIGS. 1A-1B) of the AM apparatus 10, one or more parts 22 (see FIGS. 1A-1B) with a build material 23 (see FIGS. 1A-1B), such as a powder 24 (see FIGS. 1A-1B), using a build operation 26 (see FIGS. 1A-1B) of the AM process 12 (see FIGS. 1A-1B). Unused build material 23a (see FIGS. 1A-1B), such as unused powder 24a (see FIGS. 1A-1B), accumulates in the build chamber 20 during the build operation 26.

The step 222 (see FIG. 3) of building in the build chamber 20 of the AM apparatus 10, one or more parts 22, comprises building in the build chamber 20 of the AM apparatus 10, where the AM apparatus 10 further comprises a powder delivery assembly 150 (see FIGS. 1B, 2A), to supply build material 23 (see FIGS. 1B, 2A), such as powder 24 (see FIGS. 1B, 2A), to the build assembly 18 (see FIGS. 1B, 2A)

and to the build chamber 20. The AM apparatus 10 may further comprise an energy delivery assembly 162 (see FIGS. 1B, 2A), to melt the build material 23, such as powder 24, in the build chamber 20 used to build the one or more parts 22 (see FIGS. 1B, 2A), during the build operation 26. The AM apparatus 10 may further comprise a powder overflow chamber 180 (see FIGS. 1B, 2A), to catch any unused build material 23a (see FIGS. 1B, 2A), such as unused powder 24a (see FIGS. 1B, 2A), that overflows out of the build chamber 20. The AM apparatus 10 may further comprise an environmental control assembly 206 (see FIGS. 1B, 2A), to control temperature and pressure within the AM apparatus 10. The AM apparatus 10 may further comprise a housing structure 196 (see FIGS. 1B, 2A) that houses the build chamber 20, the powder delivery assembly 150, the energy delivery assembly 162, the powder overflow chamber 180, and the environmental control assembly 206.

As shown in FIG. 3, the method 220 further comprises the step 224 of automatically removing the unused powder from the build chamber, using the vacuum assembly 52 (see FIGS. 1A-1B, 2A) of the AM apparatus 10. The vacuum assembly 52 is coupled to the build chamber 20 (see FIGS. 1A-1B, 2A).

As discussed in detail above, the vacuum assembly 52 comprises one or more duct lines 54 (see FIGS. 1A-1B, 2A) in flow communication with the build chamber 20 (see FIGS. 1A-1B, 2A), via one or more build chamber openings 28 (see FIGS. 1A-1B, 2A). Each of the one or more duct lines 54 has a check valve assembly 60 (see FIGS. 1A-1B, 2A). The check valve assembly 60 comprises a check valve 62 (see 1A, 2B, 2C) and an actuator 64 (see 1A, 2B, 2C), such as a pneumatic actuator 64a (see 1A, 2B, 2C), to control a flow 73 (see FIG. 1A) of the unused powder 24a (see 1A, 2A) from the build chamber 20.

The vacuum assembly 52 further comprises a powder receptacle 80 (see FIGS. 1A-1B) in flow communication with the one or more duct lines 54. The powder receptacle 80 comprises one or more coupling members 100 (see FIGS. 1A-1B), such as one or more quick disconnect coupling members 100a (see FIGS. 1A-1B), allowing the powder receptacle 80 to be reversibly attached to the one or more duct lines 54, and to be reversibly attached to one or more vacuum duct lines 122 (see FIGS. 1A-1B, 2A).

The vacuum assembly 52 further comprises a vacuum apparatus 120 (see FIGS. 1A-1B), such as in the form of vacuum pump 120a (see FIG. 1A), coupled to, and in flow communication with, the powder receptacle 80, via the one or more vacuum duct lines 122 (see FIGS. 1A-1B), such as one or more flexible vacuum duct lines 123 (see FIG. 1A). The AM apparatus 10, 10a, may further comprise a power source 142 (see FIGS. 1A-1B) coupled to the AM assembly 14, such as AM assembly 14a, and coupled to the vacuum assembly 52. The AM apparatus 10, 10a, may further comprise a control system 144 (see FIGS. 1A-1B) coupled to the AM assembly 14, such as AM assembly 14a, and coupled to the vacuum assembly 52.

The vacuum assembly 52 pulls and transfers the unused build material 23a, such as unused powder 24a, from the build chamber 20 to the powder receptacle 80, via the one or more duct lines 54. This avoids a manual removal 139 (see FIGS. 1A-1B) of the unused build material 23a, such as the unused powder 24a, from the build chamber 20 (see FIGS. 1A-1B).

As shown in FIG. 3, the method 220 may optionally, further comprise the step 226 of automatically removing, with the vacuum assembly 52 any unused powder 24a comprising overflow powder 24c (see FIGS. 1B, 2E), from a powder overflow chamber 180 (see FIGS. 1B, 2E) coupled to the build chamber 20, and transferring the overflow powder 24c into the powder receptacle 80 (see FIGS. 1B, 2E), via one or more overflow duct lines 182 (see FIG. 2E) coupled between the powder overflow chamber 180 and the one or more duct lines 54.

The AM assembly 14 may be assembled with the powder overflow chamber 180 (see FIGS. 1B, 2E), and the vacuum assembly 52 may be assembled with one or more overflow duct lines 182 (see FIG. 2E) between the powder overflow chamber 180 and the one or more duct lines 54, to automatically remove with the vacuum assembly 52, any unused powder 24a (see FIG. 2E) comprising overflow powder 24c (see FIG. 2E), from the powder overflow chamber 180, and to transfer the unused powder 24a into the powder receptacle 80 (see FIG. 2E).

As shown in FIG. 3, the method 220 further comprises after the step 224 of automatically removing the unused build material 23a, such as unused powder 24a, from the build chamber 20, and transferring the unused build material 23a, such as unused powder 24a, into the powder receptacle 80, and after the step 226 of automatically removing, with the vacuum assembly 52 any unused powder 24a from the powder overflow chamber 180, the step 228 of optionally, uncoupling the powder receptacle 80 containing the unused build material 23a, such as unused powder 24a, from the one or more duct lines 54 (see FIG. 2A) and from the one or more vacuum duct lines 122 (see FIG. 2A), and transporting the powder receptacle 80, via a mobile transporting apparatus 118 (see FIGS. 1B, 2A), to a powder sieve apparatus 110 (see FIG. 1B) for sieving of the unused build material 23a, such as unused powder 24a.

The method 220 (see FIG. 6) may further comprise before the step 222 of building, in the build chamber 20 of the AM apparatus 10, the one or more parts 22, the steps of cutting the one or more build chamber openings 28 (see FIG. 2A) through the one or more walls 30 (see FIG. 2A) of the build chamber 20 (see FIG. 2A), and positioning the one or more build chamber openings 28, wherein a bottom portion 29 (see FIGS. 2B, 2C) of each of the one or more build chamber openings 28 (see FIGS. 2B, 2C) is aligned with a ground floor position 40 (see FIGS. 2B, 2C) of the build platform 36 (see FIGS. 2B, 2C) in the build chamber 20 (see FIGS. 2B, 2C). The build platform 36 is preferably at, or lowered to, the ground floor position 40 (see FIGS. 2B, 2C) by a build piston 38 (see FIG. 2A) in the build chamber 20, after the one or more parts 22 (see FIG. 2A) are built with the build material 23, such as powder 24.

The step 224 of automatically removing the unused build material 23a, such as unused powder 24a, from the build chamber 20, and transferring the unused build material 23a, such as unused powder 24a, into the powder receptacle 80 may further comprise removing the unused build material 23a, such as unused powder 24a, from the build chamber 20 to the powder receptacle 80, via the one or more build chamber openings 28, via the check valve assembly 60 (see FIGS. 2A-2C), and via the one or more duct lines 54 (see FIGS. 2A-2C); pulling or drawing the unused build material 23a, such as unused powder 24a, through the one or more duct lines 54 using the vacuum apparatus 120 (see FIGS. 1A, 2A) comprising a vacuum pump 120a (see FIG. 2A); and collecting the unused build material 23a, such as unused powder 24a, in the powder receptacle 80 (see FIG. 2A).

Figure 4:
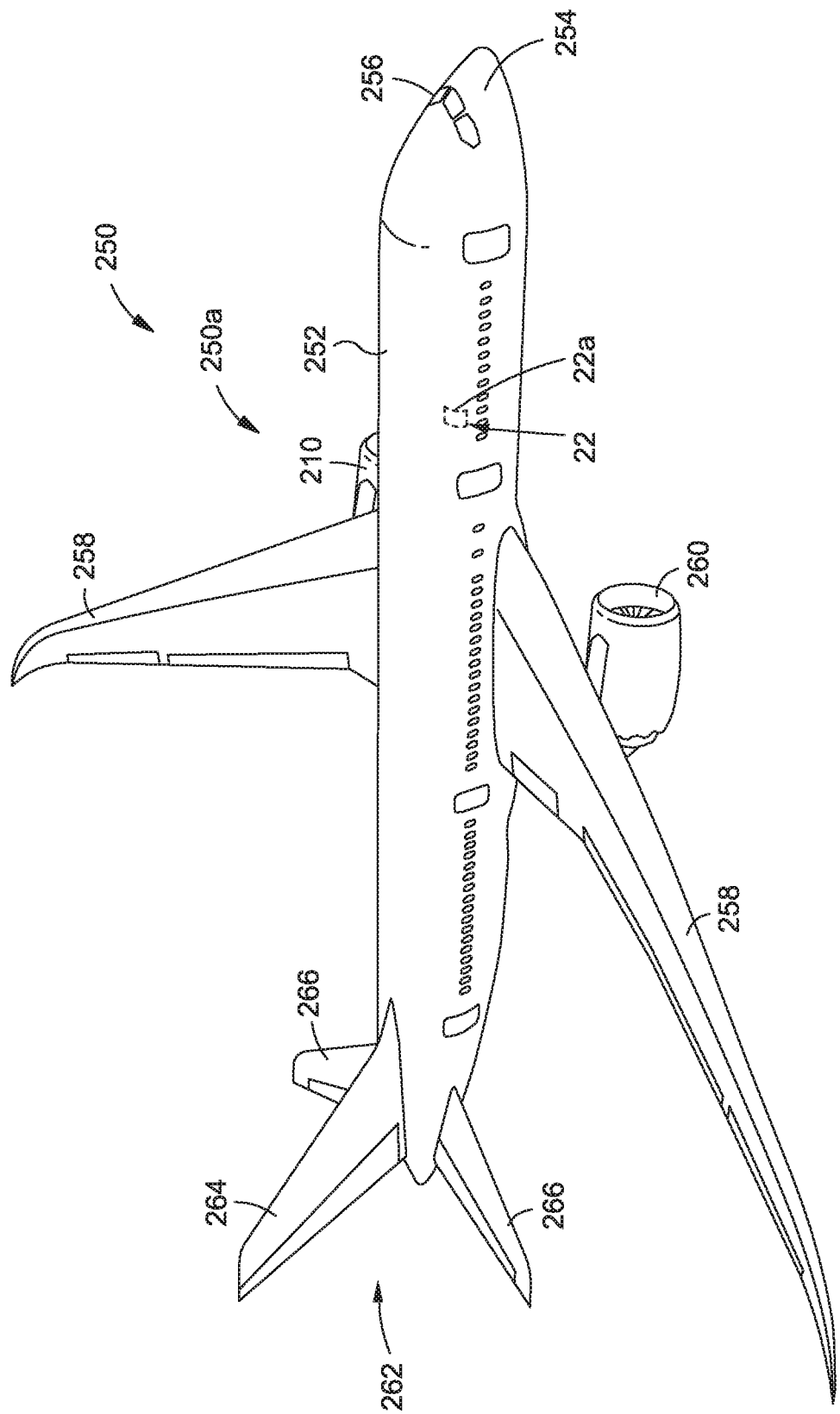
FIG. 4 is an illustration of a perspective view of an air vehicle that incorporates one or more parts manufactured using an exemplary version of an additive manufacturing apparatus and additive manufacturing system of the disclosure.

Now referring to FIG. 4, FIG. 4 is an illustration of a perspective view of an air vehicle 250, such as in the form of aircraft 250a, that incorporates one or more parts 22, such as built parts 22a, manufactured using an exemplary version of the additive manufacturing (AM) apparatus 10 (see FIGS. 1A-1B) and the additive manufacturing (AM) system 16 (see FIG. 1B) for an additive manufacturing (AM) process 12 (see FIGS. 1A-1B) of the disclosure.

As shown in FIG. 4, the air vehicle 250, such as in the form of aircraft 250a, comprises a fuselage 252, a nose 254, a cockpit 256, wings 258, engines 260, and an empennage 262 comprising horizontal stabilizers 264 and a vertical stabilizer 266. The air vehicle 250 (see FIG. 4), such as in the form of aircraft 250a (see FIG. 4), comprises one or more parts 22, such as built parts 22a, installed within the aircraft 250a, or alternatively, installed in the engines 260, the wings 258, the empennage 262, or other suitable areas of the aircraft 250a.

Figure 5:
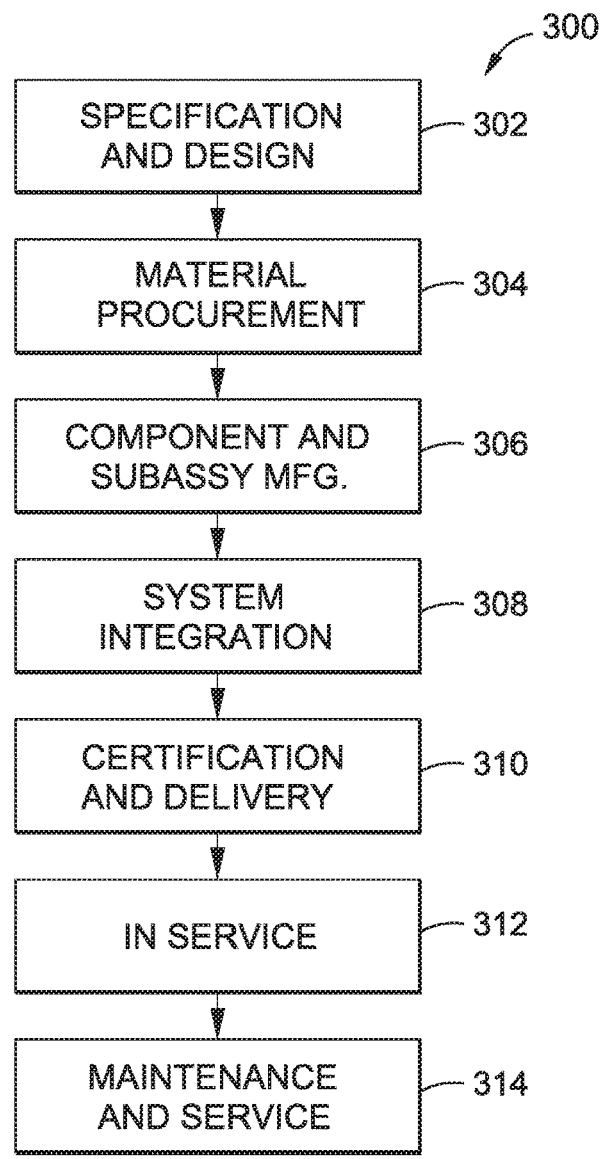
FIG. 5 is an illustration of a flow diagram of an exemplary aircraft manufacturing and service method.
Figure 6:
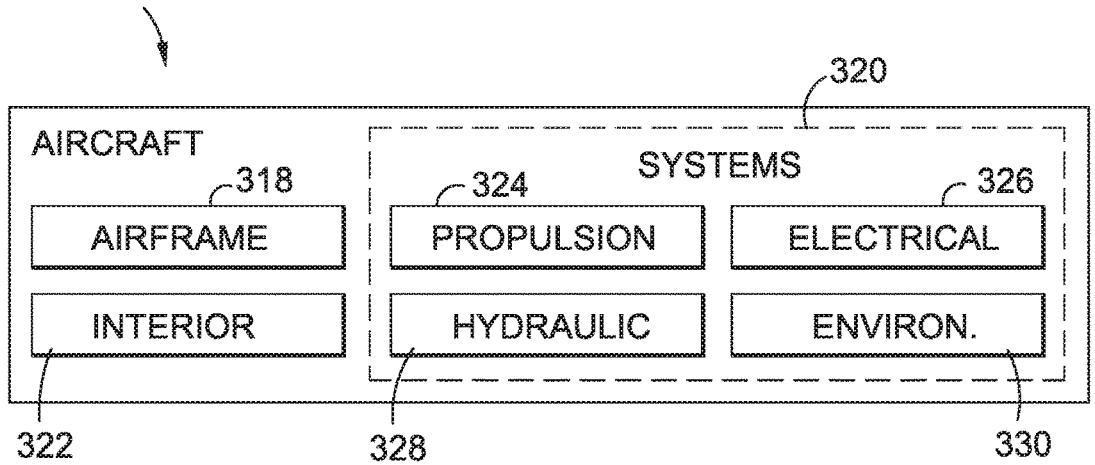
FIG. 6 is an illustration of an exemplary block diagram of an aircraft.

Now referring to FIGS. 5 and 6, FIG. 5 is an illustration of a flow diagram of an exemplary aircraft manufacturing and service method 300, and FIG. 6 is an illustration of an exemplary block diagram of an aircraft 316. Referring to FIGS. 5 and 6, versions of the disclosure may be described in the context of the aircraft manufacturing and service method 300 as shown in FIG. 5, and the aircraft 316 as shown in FIG. 6.

During pre-production, exemplary aircraft manufacturing and service method 300 may include specification and design 302 of the aircraft 316 and material procurement 304. During manufacturing, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 6, the aircraft 316 produced by the exemplary aircraft manufacturing and service method 300 may include an airframe 318 with a plurality of systems 320 and an interior 322. Examples of the plurality of systems 320 may include one or more of a propulsion system 324, an electrical system 326, a hydraulic system 328, and an environmental system 330. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 316 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 316. Similarly, one or more of apparatus embodiments, method embodiments, or a combination thereof, may be utilized while the aircraft 316 is in service 312, for example and without limitation, to maintenance and service 314.

Disclosed versions of the additive manufacturing (AM) apparatus 10 (see FIG. 1A), such as AM apparatus 10a (see FIG. 1B), and the additive manufacturing (AM) system 16, both having the vacuum assembly 52 (see FIGS. 1A-1B, 2A), and the method 220 (see FIG. 3), provide an in situ or on site powder collection and removal system 50 (see FIG. 1B) comprising a vacuum assembly 52 that enables quick and efficient removal of unused build material 23a (see FIGS. 2A, 2D, such as unused powder 24a (see FIGS. 2A, 2D), from the build chamber 20 (see FIGS. 2A, 2D) of the AM assembly 14 of the AM apparatus 10. One or more duct lines 54 (see FIGS. 2A, 2D), such as vacuum lines or vacuum tubes, are coupled between the build chamber 20 (see FIGS. 2A, 2D), and the powder receptacle 80, such that when the one or more parts 22 (see FIGS. 2A, 2D) are built and the build operation 26 (see FIGS. 1A-1B) is complete, the unused build material 23a, such as unused powder 24a, and optionally, any overflow build material 23b (see FIG. 2E), such as overflow powder 24c (see FIG. 2E), can be automatically removed from, and sucked out of, the build chamber 20, and optionally, from the powder overflow chamber 180 (see FIG. 2E), by simply turning on the vacuum assembly 52, for example, the vacuum apparatus 120, such as the vacuum pump 120a which pulls a vacuum through the vacuum duct lines 122 and the duct lines 54. Thus, automated removal 138 (see FIGS. 1A-1B) is achieved, and manual removal 139 (see FIGS. 1A-1B) is avoided, as manual removal 139 involves increased time and increased labor, and in turn, may result in increased cost. By having the vacuum assembly 52, such as the integrated vacuum assembly 52a, removably and reversibly attached to the AM assembly 14, and in situ with the AM apparatus 10 and AM system 16, the build operation 26 (see FIGS. 1A-1B) of the AM process 12 (see FIGS. 1A-1B) is streamlined, build time is decreased, labor is decreased, and in turn, costs of AM manufacturing of the parts 22 may be decreased.

In addition, disclosed versions of the AM apparatus 10 (see FIG. 1A), such as AM apparatus 10a (see FIG. 1B), and the AM system 16, both having the vacuum assembly 52 (see FIGS. 1A-1B, 2A), and the method 220 (see FIG. 3), enable automatic collection of the unused build material 23a, such as unused powder 24a, and optionally, any overflow build material 23b (see FIG. 2E), such as overflow powder 24c (see FIG. 2E), in a powder receptacle 80 that is sufficiently large, easily movable, combustion-proof, sturdy, easily detachable from the duct lines 54, and has airtight seals 104 (see FIG. 1A), when disconnected or detached from the duct lines 54 (see FIGS. 2A, 2D) that are connected to the build chamber 20. The unused build material 23a, such as unused powder 24a, and optionally, any overflow build material 23b (see FIG. 2E), such as overflow powder 24c (see FIG. 2E), may be automatically, rather than manually, removed and collected, and then sieved for reuse. Thus, automated collection 140 (see FIGS. 1A-1B) is achieved, and manual collection 141 (see FIGS. 1A-1B) is avoided.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive.

Although specific terms are employed herein, they are used in a generic and descriptive sense only and not for purposes of limitation.

What is claimed is:

1. An additive manufacturing apparatus for an additive manufacturing process, the additive manufacturing apparatus comprising:
   an additive manufacturing assembly comprising:
      a build assembly having a build chamber to support one or more parts built with a powder, in a build operation of the additive manufacturing process, wherein unused powder accumulates in the build chamber during the build operation;
      a powder delivery assembly to supply the powder to the build assembly; and
      a housing structure that houses the build assembly and the powder delivery assembly;
   a vacuum assembly coupled to the build chamber of the additive manufacturing assembly, the vacuum assembly comprising:
      one or more duct lines in flow communication with the build chamber, each of the one or more duct lines having a check valve assembly comprising a check valve and an actuator, to control a flow of the unused powder from the build chamber;
      a powder receptacle located outside the housing structure and separate from the powder delivery assembly, and in flow communication with the one or more duct lines, the powder receptacle comprising one or more quick disconnect coupling members each positioned in an opening formed through the powder receptacle, the one or more quick disconnect coupling members allowing the powder receptacle to be attached to and detachable from the one or more duct lines, and wherein the powder receptacle comprises one or more of the quick disconnect coupling members each fitted in a vacuum duct line opening formed through the powder receptacle, the one or more of the quick disconnect coupling members allowing the powder receptacle to be attached to and detachable from one or more vacuum duct lines; and
      a vacuum apparatus located outside the housing structure and coupled to, and in flow communication with, the powder receptacle, via the one or more vacuum duct lines,
   wherein the vacuum assembly pulls the unused powder from the build chamber to the powder receptacle, via the one or more duct lines, and further wherein the vacuum assembly operates to provide an automated removal of the unused powder from the build chamber into the powder receptacle, to avoid a manual removal of the unused powder from the build chamber.

2. The additive manufacturing apparatus of claim 1, wherein each of the one or more duct lines has a first end coupled to a build chamber opening formed in a wall of the build chamber, and each of the one or more duct lines has a second end coupled to one of the one or more quick disconnect coupling members.

3. The additive manufacturing apparatus of claim 1, wherein each of the one or more duct lines comprises a flexible duct line, and further wherein each of the one or more vacuum duct lines comprises a flexible vacuum duct line.

4. The additive manufacturing apparatus of claim 1, wherein the check valve assembly comprises a pneumatic flapper check valve, and wherein the actuator comprises a pneumatic actuator for actuating the pneumatic flapper check valve.

5. The additive manufacturing apparatus of claim 1, wherein the powder receptacle has an output nozzle for attachment to an input nozzle of a powder sieve apparatus, the output nozzle facilitating transfer of the unused powder in the powder receptacle to the powder sieve apparatus.

6. The additive manufacturing apparatus of claim 5, wherein the powder receptacle has a plurality of base attachment portions attached to and extending from a base of the powder receptacle, the plurality of base attachment portions for attachment to a mobile transporting apparatus, the mobile transporting apparatus configured to transport the powder receptacle, including configured to transport the powder receptacle to the powder sieve apparatus for sieving of the unused powder.

7. The additive manufacturing apparatus of claim 1, wherein the build assembly further comprises a build platform, and a build piston configured to lower the build platform to a ground floor position aligned with a bottom portion of each build chamber opening, after the one or more parts are built with the powder.

8. The additive manufacturing apparatus of claim 1, wherein each of the one or more vacuum duct lines has a filter element coupled at a first end of each of the one or more vacuum duct lines, and further wherein the one or more of the quick disconnect coupling members allow the powder receptacle to be attached to and detachable from the one or more vacuum duct lines, via the filter element.

9. The additive manufacturing apparatus of claim 1, wherein the vacuum apparatus comprises a vacuum pump.

10. An additive manufacturing system for an additive manufacturing process, the additive manufacturing system comprising:
   an additive manufacturing apparatus comprising:
      an additive manufacturing assembly comprising:
         a build assembly having a build chamber to support one or more parts built with a powder, in a build operation of the additive manufacturing process, wherein unused powder accumulates in the build chamber during the build operation;
         a powder delivery assembly to supply the powder to the build assembly;
         an energy delivery assembly to melt the powder in the build chamber used to build the one or more parts, during the build operation;
         a powder overflow chamber; and
         a housing structure that houses the build assembly, the powder delivery assembly, the energy delivery assembly, and the powder overflow chamber; and
      a vacuum assembly coupled to the build chamber of the additive manufacturing apparatus, via one or more housing openings, the vacuum assembly comprising:
         one or more duct lines in flow communication with the build chamber, each of the one or more duct lines having a check valve assembly comprising a check valve and an actuator, to control a flow of the unused powder from the build chamber;
         a powder receptacle located outside the housing structure and separate from the powder delivery assembly, the powder receptacle in flow communication with the one or more duct lines, the powder receptacle comprising one or more quick disconnect coupling members each positioned in an opening formed through the powder receptacle, the one or more quick disconnect coupling members allowing the powder receptacle to be attached to and detachable from the one or more duct lines, and wherein the powder receptacle comprises one or more of the quick disconnect coupling members each fitted in a vacuum duct line opening formed through the powder receptacle, the one or more of the quick disconnect coupling members allowing the powder receptacle to be attached to and detachable from one or more vacuum duct lines; and a vacuum apparatus located outside the housing structure and coupled to, and in flow communication with, the powder receptacle, via the one or more vacuum duct lines, each of the one or more vacuum duct lines coupled to a filter element;

a power source coupled to the additive manufacturing assembly and coupled to the vacuum assembly, to power the additive manufacturing assembly and to power the vacuum assembly; and a control system coupled to the additive manufacturing assembly and coupled to the vacuum assembly, to control the additive manufacturing assembly and to control the vacuum assembly, wherein the vacuum assembly pulls the unused powder from the build chamber to the powder receptacle, via the one or more duct lines, and further wherein the vacuum assembly operates to provide an automated removal of the unused powder from the build chamber into the powder receptacle, to avoid a manual removal of the unused powder from the build chamber.

11. The additive manufacturing system of claim 10, further comprising an overflow duct line coupled between an overflow chamber opening formed in the powder overflow chamber, and an overflow port formed in one of the one or more duct lines.

12. The additive manufacturing system of claim 10, further comprising a mobile transporting apparatus, for transporting the powder receptacle containing the unused powder, including transporting the powder receptacle to a powder sieve apparatus for sieving of the unused powder.

13. The additive manufacturing system of claim 10, wherein each of the one or more duct lines has a first end coupled to a build chamber opening formed in a wall of the build chamber, and each of the one or more duct lines has a second end coupled to one of the one or more quick disconnect coupling members.

14. The additive manufacturing system of claim 13, wherein the build assembly further comprises a build platform, and a build piston configured to lower the build platform to a ground floor position aligned with a bottom portion of each build chamber opening, after the one or more parts are built with the powder.

15. A method of using an additive manufacturing apparatus with a vacuum assembly, to automatically remove unused powder accumulated during an additive manufacturing process, the method comprising the steps of:

building in a build chamber of the additive manufacturing apparatus, one or more parts with a powder supplied from a powder delivery assembly, using a build operation of the additive manufacturing process, wherein unused powder accumulates in the build chamber during the build operation, and wherein a housing structure houses the build chamber and the powder delivery assembly; and automatically removing the unused powder from the build chamber, using the vacuum assembly of the additive manufacturing apparatus, the vacuum assembly coupled to the build chamber, and the vacuum assembly comprising:

one or more duct lines in flow communication with the build chamber, via one or more build chamber openings, each of the one or more duct lines having a check valve assembly comprising a check valve and an actuator, to control a flow of the unused powder from the build chamber;

a powder receptacle located outside the housing structure and separate from the powder delivery assembly, and in flow communication with the one or more duct lines, the powder receptacle comprising one or more quick disconnect coupling members each positioned in an opening formed through the powder receptacle, the one or more quick disconnect coupling members allowing the powder receptacle to be attached to and detachable from the one or more duct lines, and wherein the powder receptacle comprises one or more of the quick disconnect coupling members each fitted in a vacuum duct line opening formed through the powder receptacle, the one or more of the quick disconnect coupling members allowing the powder receptacle to be attached to and detachable from one or more vacuum duct lines; and a vacuum apparatus located outside the housing structure and coupled to, and in flow communication with, the powder receptacle, via the one or more vacuum duct lines, wherein the vacuum assembly pulls and transfers the unused powder from the build chamber to the powder receptacle, via the one or more duct lines, to avoid a manual removal of the unused powder from the build chamber.

16. The method of claim 15, further comprising the step of automatically removing, with the vacuum assembly any unused powder comprising overflow powder, from a powder overflow chamber coupled to the build chamber, and transferring the overflow powder into the powder receptacle, via one or more overflow duct lines coupled between the powder overflow chamber and the one or more duct lines.

17. The method of claim 16, further comprising after the step of automatically removing the unused powder from the build chamber, and after the step of automatically removing any unused powder from the powder overflow chamber, the step of uncoupling the powder receptacle from the one or more duct lines and from the one or more vacuum duct lines, and transporting the powder receptacle, via a mobile transporting apparatus, to a powder sieve apparatus for sieving of the unused powder.

18. The method of claim 15, wherein the step of building in the build chamber of the additive manufacturing apparatus comprises building in the build chamber of the additive manufacturing apparatus further comprising:

a powder delivery assembly, to supply powder to the build chamber;

an energy delivery assembly, to melt the powder in the build chamber used to build the one or more parts, during the build operation;

a powder overflow chamber, to catch any unused powder that overflows out of the build chamber; and an environmental control assembly, to control temperature and pressure within the additive manufacturing apparatus, wherein the housing structure houses the powder delivery assembly, the energy delivery assembly, the powder overflow chamber, and the environmental control assembly.

19. The method of claim 15, further comprising before the step of building in the build chamber of the additive manufacturing apparatus, the one or more parts, the steps of cutting the one or more build chamber openings through one or more walls of the build chamber, and positioning the one or more build chamber openings wherein a bottom portion of each of the one or more build chamber openings is aligned with a ground floor position of a build platform in the build chamber, the build platform at, or lowered to, the ground floor position by a build piston in the build chamber, after the one or more parts are built with the powder.

20. The method of claim 15, wherein the step of automatically removing the unused powder from the build chamber, and transferring the unused powder into the powder receptacle further comprises:
   removing the unused powder from the build chamber to the powder receptacle, via the one or more build chamber openings, via the check valve assembly, and via the one or more duct lines;
   pulling the unused powder through the one or more duct lines using the vacuum apparatus comprising a vacuum pump; and
   collecting the unused powder in the powder receptacle.

* * * * *